United States Patent
Kulkarni et al.

(10) Patent No.: US 9,936,018 B2
(45) Date of Patent: Apr. 3, 2018

(54) TASK-CONTEXT ARCHITECTURE FOR EFFICIENT DATA SHARING

(71) Applicant: McAfee, LLC, Plano, TX (US)

(72) Inventors: Dattatraya Kulkarni, Bangalore (IN); Srikanth Nalluri, Bangalore (IN); Kamlesh Halder, Bangalore (IN); Venkatasubrahmanyam Krishnapur, Bangalore (IN); Shailaja Shankar, Cupertino, CA (US); Kaushal Kumar Dhruw, Bangalore (IN); Kranthikumar Gadde, Bangalore (IN)

(73) Assignee: McAfee, LLC, Plano, TX (US)

(*) Notice: Subject to any disclaimer, the term of this patent is extended or adjusted under 35 U.S.C. 154(b) by 0 days.

(21) Appl. No.: 14/912,318

(22) PCT Filed: Dec. 14, 2013

(86) PCT No.: PCT/US2013/075205
§ 371 (c)(1),
(2) Date: Feb. 16, 2016

(87) PCT Pub. No.: WO2015/047433
PCT Pub. Date: Apr. 2, 2015

(65) Prior Publication Data
US 2016/0212208 A1 Jul. 21, 2016

(30) Foreign Application Priority Data
Sep. 27, 2013 (IN) .......................... 4387/CHE/2013

(51) Int. Cl.
*G06F 15/16* (2006.01)
*H04L 29/08* (2006.01)
*G06F 9/50* (2006.01)

(52) U.S. Cl.
CPC ........ *H04L 67/1095* (2013.01); *G06F 9/5072* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |

(Continued)

FOREIGN PATENT DOCUMENTS

| | | |
|---|---|---|
| CN | 1577279 A | 2/2005 |
| CN | 1609858 A | 4/2005 |

(Continued)

OTHER PUBLICATIONS

International Search Report and Written Opinion in International Application No. PCT/US2013/075205, mailed Apr. 30, 2014, 9 pages.

(Continued)

*Primary Examiner* — Esther B Henderson
(74) *Attorney, Agent, or Firm* — Patent Capital Group

(57) ABSTRACT

To provide a more seamless experience across multiple devices, task streaming systems and methods allow a user to create "task-contexts" and manage metadata of files stored across multiple data storage devices and user preferences associated with capabilities of the multiple devices for operating on the file. Furthermore, the task streaming systems and methods are provided to allow task-contexts to be shared from one device to another device. A task-context specifies one or more files and one or more operations to be performed on the one or more files. By providing a task-context from one device to the other device, a user can accomplish a task with a particular file and seamlessly transition between devices with minimal disruption and effort.

33 Claims, 12 Drawing Sheets

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 7,567,987 B2 | 7/2009 | Shappell et al. |
| 7,640,506 B2 | 12/2009 | Pratley et al. |
| 8,719,845 B2 | 5/2014 | Augustine et al. |
| 9,430,047 B2 | 8/2016 | Liang |
| 2007/0171921 A1 | 7/2007 | Wookey et al. |
| 2007/0199025 A1 | 8/2007 | Angiolillo et al. |
| 2010/0312596 A1 | 12/2010 | Saffari et al. |
| 2011/0016087 A1 | 1/2011 | Freedman |
| 2012/0278281 A1 | 11/2012 | Meisels et al. |

FOREIGN PATENT DOCUMENTS

| | | |
|---|---|---|
| CN | 102523346 A | 6/2012 |
| CN | 102801847 A | 11/2012 |
| CN | 102893272 A | 1/2013 |
| CN | 103064829 A | 4/2013 |
| CN | 103118077 A | 5/2013 |
| JP | 2004/038941 A | 2/2004 |
| WO | WO 2015/047433 A1 | 4/2015 |

OTHER PUBLICATIONS

May 11, 2017 First Office Action from Chinese Application No. 201380079194.2; 12 pages.

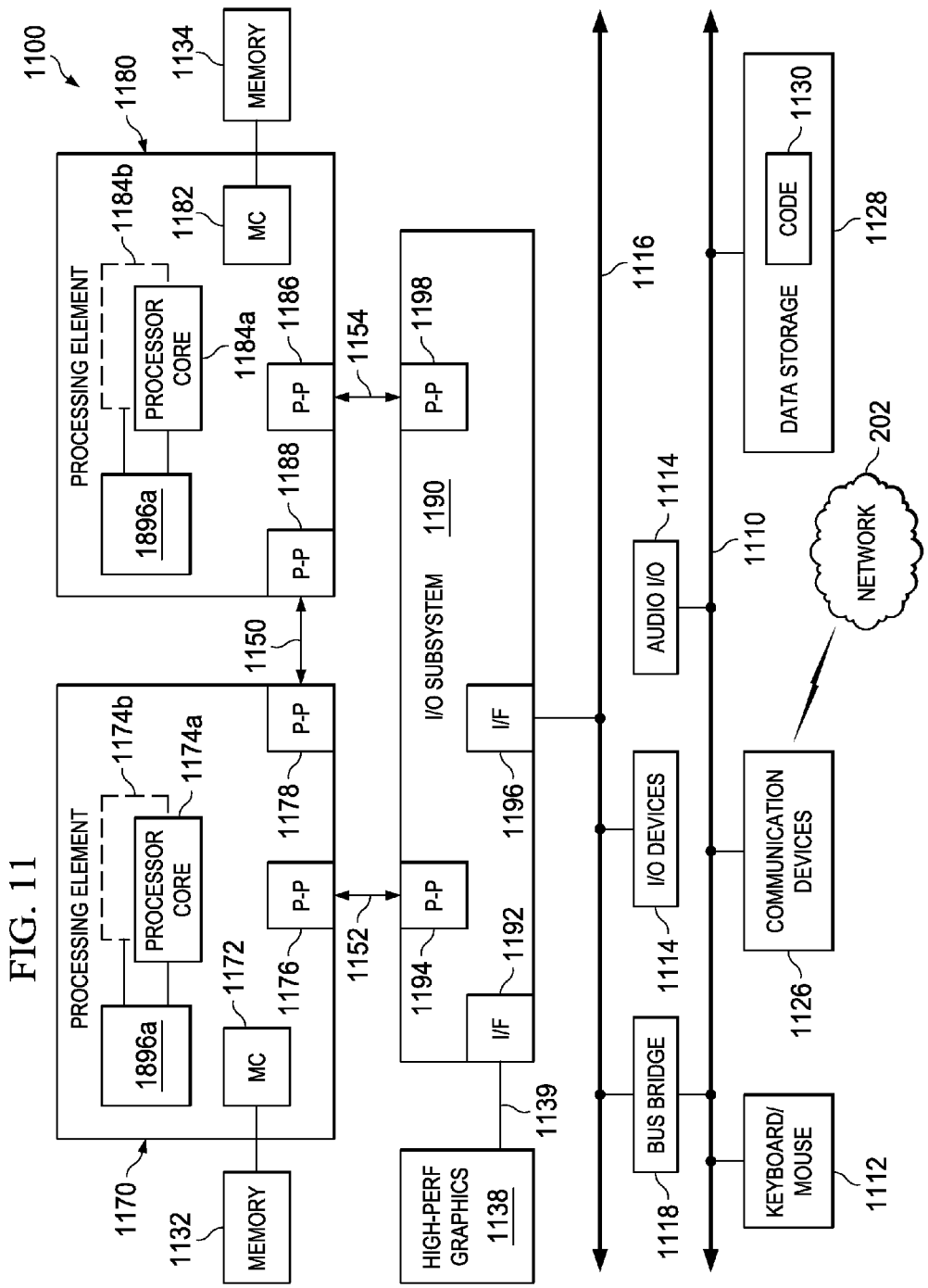

TASK-CONTEXT ARCHITECTURE FOR EFFICIENT DATA SHARING

PRIORITY DATA

This application is a National Stage application under 35 U.S.C. 371 of International Application PCT/US13/75205 filed on Dec. 14, 2013 and entitled TASK-CONTEXT ARCHITECTURE FOR EFFICIENT DATA SHARING, which claims priority to an Indian Provisional Patent Application Serial No. 4387/CHE/2013, filed on Sep. 27, 2013 and entitled TASK-CONTEXT ARCHITECTURE FOR EFFICIENT DATA SHARING. The disclosures of the prior applications are considered part of and are incorporated by reference in the disclosure of this application.

TECHNICAL FIELD

Embodiments described herein generally relate to the field of data synchronicity, and more particularly to a task-context architecture for efficient sharing of data across a plurality of devices.

BACKGROUND

Two key usage changes are rapidly transforming the consumer world propelled by smart devices in a variety of form factors: a) device proliferation into all layers of the society; and b) rapidly increasing number of devices used in a family or household. Several studies have shown that a new usage is emerging. "Sequential screening", one of many examples, was discussed as an emerging new use in a publication entitled "The New Multi-screen World: Understanding Cross-platform Consumer Behavior" (Google, August 2012). Through sequential screening, users may use multiple screens, for example a smart phone, tablet, and notebook, between starting and finishing a task. There are many reasons for this emerging usage, including by way of non-limiting examples: a) availability of many devices around the house and at work place; b) physical proximity to the device; c) user's preference for certain applications and devices; d) ease of use of a specific device for a specific need; and e) connectivity. This is one motivation for storing browser history in the cloud so that the browsing activity on a device starts where the user left it on another device. The usage is expected to evolve as device capabilities expand and as consumers realize the possibilities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 11 is a block diagram of an example computing system that is arranged in a point-to-point (PtP) configuration according to an embodiment.

DETAILED DESCRIPTION OF EMBODIMENTS

Figure 1A:
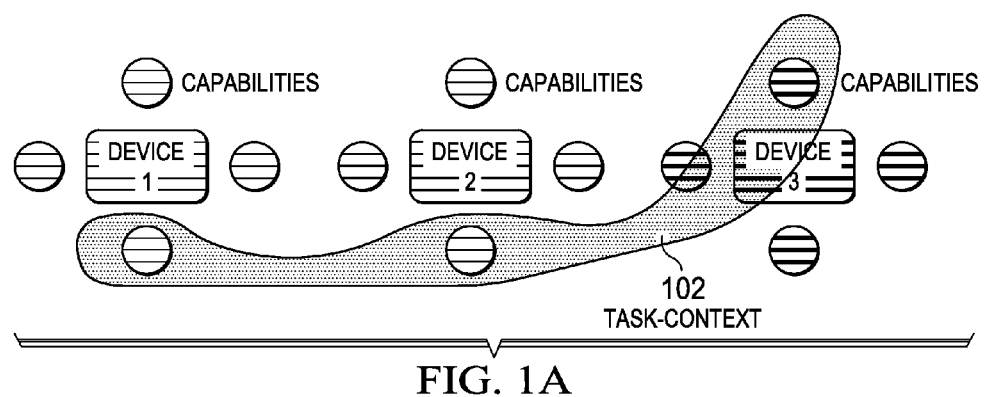
FIGS. 1A-B illustrate the concept and examples of a "task-context" across a plurality of devices with which a user interacts, according to some embodiments of the disclosure.

Certain user tasks, including those around creativity and productivity usages involve developing and improving user-generated content, including for example documents, photographs, research and analysis, and video, across multiple devices. Many of these tasks require multiple sessions with multiple devices, so that tasks are started, progressed and completed across multiple screens. Sometimes, such cross device usage is the result of user's need to select the right device for the task at hand, for example by capabilities of the device, size of the screen, security features of the device, availability and capabilities of the applications, ease of use, or simply user's preference based on proximity or personal choice.

To provide a more seamless experience across multiple devices, task streaming systems and methods disclosed herein allow a user to create "task-contexts" and manage metadata of files stored across multiple data storage devices and user preferences associated with capabilities of the multiple devices for operating on the file. Furthermore, the task streaming systems and methods are provided to allow task-contexts to be shared from one device to another device. A task-context specifies one or more files and one or more operations to be performed on the one or more files. By providing a task-context from one device to the other device, a user can accomplish a task with a particular file and seamlessly transition between devices with minimal disruption and effort.

Within the context of this disclosure, metadata for identifying one or more files include one or more of the following: file name, file identifier, file location, file size, file type, ownership information, permissions, security information such as scan results, preview icon, last edited time and date, time and date created, and any other suitable properties or characteristics associated with a file. Metadata does not include the full content of the file.

In one example, a system and method for contextually sharing files and data between a plurality of devices is disclosed. A user may operate on a file via a first device, and after completing the operation, identify a second operation to be performed on a second device. The user may attach a task-context metadata tag to the file via a user interface. The first device may then send a notification message to the second device, indicating that the file is to be received, and what task/operation is to be performed. After the task/operation is complete, the second device may return the file to the first device or forward it to a third device for another operation.

Different embodiments many have different advantages, and no particular advantage is necessarily required of any embodiment.

Task-Context: Definition and Examples

Within the context of this disclosure, a "task-context" relates to a piece of work undertaken by a user, e.g., an operation on a file using one or more capabilities of a user device, where this task-context may exist across a plurality of devices. A task-context may be associated with a particular goal, or a step towards a goal, which the user may want to achieve with the data or file, irrespective of the application to be used or the location in which the goal is achieved. As we move more towards a world where many devices are being used at the same time or sequentially, a solution is needed for transferring, streaming, or sharing this task-context is more desirable than ever.

The disclosure of the present specification recognizes the fact that data is the basis of user activity. That is, as data moves across devices so should tasks associated with the data. The task here is in the broader context of what a user is trying to accomplish with the data (an operation, a task, for example, editing a movie, editing a file, uploading to a website), not executing a specific application. The present specification defines 'task-context' and provides a mechanism for streaming task-contexts from device to device. The streaming of task-contexts is achieved through a framework for sharing data and related task across devices, so that user/group of users can complete an activity/a task/an operation across a set of devices.

To illustrate the concept of a "task-context", FIG. 1A shows the concept a "task-context" 102 across a plurality of devices with which a user interacts, according to some embodiments of the disclosure. Generally speaking, a device, such as device 1, device 2, or device 3, has a set of one or more user preferences associated with capabilities corresponding to that device (denoted as circles surrounding the device). An exemplary task-context 102 may exist across device 1, device 2, and device 3, and different capabilities may be used at different devices for the task-context shared among these devices. For instance, a task context relates to reading (operation) a Word document. For device 1, e.g., a smartphone, may have a Word doc previewer application (capability) for reading the Word document. For device 2, e.g., a tablet, may have a light-weight Word application (capability) for reading the Word document. For device 3, e.g., a laptop, may have a heavy-weight Word application (capability) for reading, reviewing and editing the Word document. All of these capabilities may differ from device to device, but the task-context of reading the Word document (i.e., the task/operation on the file) remains the same and is shared across the devices.

In some embodiments, these capabilities may be associated with user preferences for specific applications or capabilities for manipulating data or different types of files. A user may prefer to use a particular application on a particular user device to perform a specific operation. In some cases, a user may prefer to use a particular application over some other applications to perform a specific operation (even though those other applications are available on the same user device). Some user preferences may be deduced/inferred from user activity and/or configuration of the device. In some cases, some user preferences may be manually provided by the user or an administrator. For a particular file, it is possible that that different capabilities can be used by different devices for performing the same operation, depending on the user preferences associated with the specific device.

Exemplary Use Cases

One embodiment of the present specification provides for a system and method to seamlessly share data and stream "task-contexts" across devices, including by way of non-limiting example, smartphones, netbooks, desktop computers, notebook computers, tablet computers, ultrabooks, and similar. This enables seamless user experience while accomplishing creativity and productivity tasks across devices. The method also helps with collaboration between members of a family and with a tool for aiding memory. The method simplifies and automates what the users normally do on their devices, without wires, without having to remember the location of the data, and without having to remember what to do with the data.

Figure 1B:
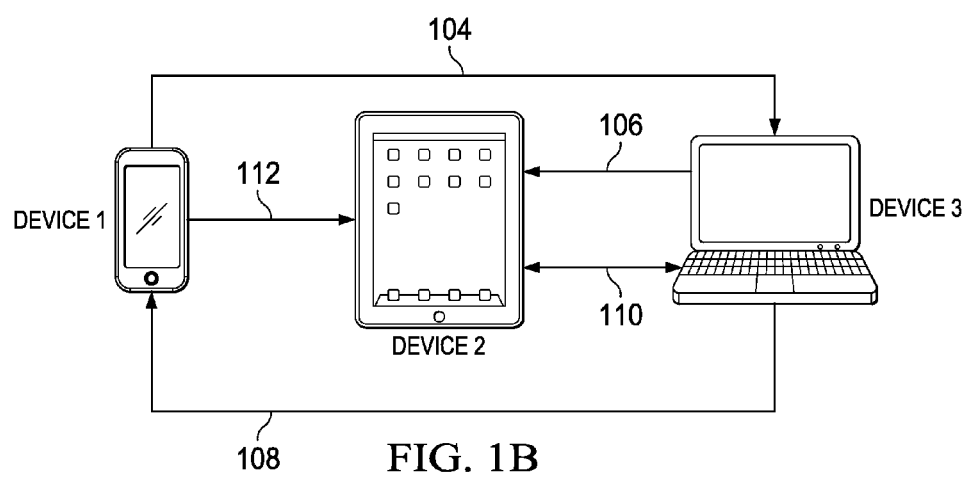

Several use cases are provided herein by way of non-limiting example. Specifically, FIG. 1B shows several exemplary uses cases of streaming a "task-context" across a plurality of devices with which a user interacts, according to some embodiments of the disclosure. These example use cases are provided to illustrate the ease of use of creating task-contexts and streaming across devices.

In one example, a user takes a picture with device 1 (e.g., a smartphone). The photo editor on the phone may be fairly basic, and the user may be more accustomed to editing applications on device 2 (e.g., a desktop/laptop computer). In accordance with an example embodiment of the present specification, the user may create a task-context to push the task of editing the photo to his desktop/laptop computer (indicated by arrow 104).

In another example, device 3 (e.g., the family laptop) has the complete music library for the family. Mom needs to have kids' favorites on device 2 (e.g., a tablet) for the road trip. Mom can search, select and push the needed songs to the tablet (indicated by arrow 106). Alternatively or additionally, Mom can search, select, and push the needed songs to the smart phone (indicated by arrow 108).

In yet another example, a user downloaded some files from the internet onto device 2 (e.g., a tablet). He does not trust the safety of these files, so he pushes the files to device 3 (e.g., his desktop/laptop computer), asking for a scan report back (indicated by arrow 110).

In yet a further example, a child is working on a school project and wants Mom to review the project on device 3 (e.g., mom's ultrabook). The child simply pushes the file, directly from the context of working on the file from device 2 (e.g., a tablet), to device 3 (e.g., mom's machine) (indicated by arrow 104), possibly with a text annotation asking mom to look at a certain aspect of the project. Mom then receives a notification on device 3 and may work on the document when she has time. It is important to note that, when mom has time to work on the project, she has everything she needs, the context and the data so that her productivity is significantly enhanced. Note further that, mom in turn can return the corrected project from device 3 to the child on device 2 using another task-context.

In another example, mom shoots a video of the children using device 1 (e.g., a smart phone), and wants to view the video device 2 (e.g., a tablet) on a larger screen with the grandparents. Mom can push the video file from device 1 (optionally converted to a different format more suitable for the tablet) as a task-context to device 2 (indicated by arrow 112). The conversion can occur transparently to the user, i.e., the user selects the task to view the video, but does not realize that the video file is converted to a different format more suitable for the tablet.

The above use cases of task streaming across multiple devices are accompanied by (1) the ability to search, display, and convert content across devices; (2) ability to manage meta data and content transfers and (3) a notification system. Note that according to one or more example embodiments of the present specification, users may avoid inefficient and round-about methods of exchanging information such as exchanging e-mails with attachments or using cables to connect devices together.

In certain cases, users could rely on alternative means of sharing data, including the following by way of non-limiting example:
  a. File sync mechanisms of cloud-based storage service 200s such as iCloud and DropBox. These provide a means to automatically synchronize data so that the data may be available across multiple devices.
  b. "Sneaker-net" mechanisms where the user physically transfers data via USB drives and devices attached to USB cables. Similarly, the user may send an email with data and notes on what to do, or sends an instant message with file attachments.
  c. Note that even then, the user has to manually carry and remember the context of the data, as in what to do with the data on the target device.

While file sync mechanisms and sneaker-net mechanisms provide a way for accomplishing tasks across devices, these mechanisms can be very cumbersome and inefficient. Advantageously, the system and method of the present specification provide a seamless mechanism to share task-contexts right at the time the user is accessing the relevant data and finishing part of a task. More importantly, the system and method of the present specification differs from these data-only services in at least three aspects:
  a. The notion of task-contexts and sharing of task-contexts across devices adds a purpose or intent to the data sharing action, especially in the context of creative and productive activities.
  b. A contextual demand-driven approach is disclosed, wherein a user shares data with another device as he/she finishes part of a task, right from the context of the data; and
  c. In an example, the user does not need access to a cloud service to share data within a local network.
  d. A comprehensive underlying framework that provides a mechanism to search content and access content across devices and cloud so that there is no need for cables.

Thus, the present specification may be viewed as a mechanism to simplify and automate certain tasks that users already perform on their devices, without, for example, encumbering wires, having to remember what to do, or having to remember the location of the data.

Task Streaming Manager and Clients; Management of Metadata and User Preferences

Figure 2:
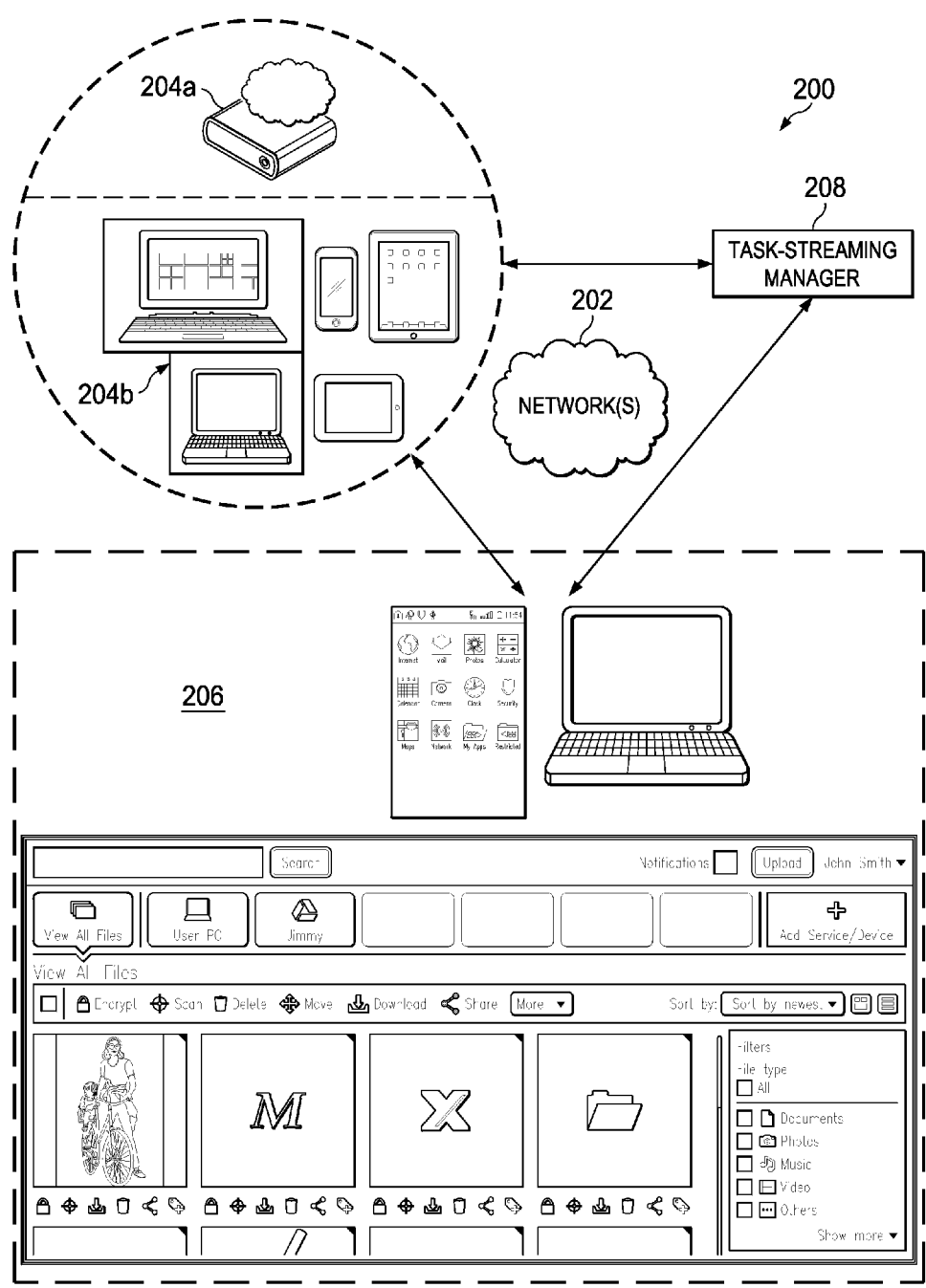
FIG. 2 is a block diagram of a cross device data management framework, according to some embodiments of the disclosure.

FIG. 2 is a block diagram of a cross device data management framework, according to some embodiments of the disclosure. To provide the ability to define a task-context and streaming the task-context from one user device to another, task streaming management system 200 comprises one or more communication networks 202, networked storage devices 204a (remote storage devices, cloud storage devices), local storage device(s) 204b (storage devices local to user devices), user devices 206 equipped with task streaming clients, and task streaming manager 208. These components of the task streaming management system 200 may be communicably connected with each other through one or more networks 202 (e.g., the Internet, local networks, Intranets, etc.).

The present disclosure relates to task streaming of files stored on networked storage device(s) 204a and local storage device(s) 204b. In other words, task streaming is "location-agnostic", allowing task-contexts associated with files stored anywhere to be streamed across user devices. User devices are devices that users may use to operate on a file, where user devices may each be associated with one or more user preferences associated with capabilities of the user device for operating on different types of files. Networked storage device(s) 204a may be storage devices for storing files, and the storage devices may be associated with cloud storage services or online remote storage services to which a user device is not local (rather, the storage devices are typically located in a data center far away from the user device). Local storage device(s) 204b may be storage devices for storing files, where the storage devices are local to a user device such as a computer or a mobile device. Files stored in either networked storage device(s) 204a and/or local storage device(s) 204b may require authentication (e.g., login credentials) in order for task streaming manager 208 and/or user devices 206 to access those files or retrieve metadata associated with those files.

To create a task-context, a task streaming client on a first user device (e.g., user devices 206) may receive one or more user selections of: a file, an operation to be performed on a second user device with the file, and the second device. The user may use the task streaming client on the first device to select the file from a plurality of files stored on a plurality of devices (networked or local), select the operation from available operation(s) of the second device for operating on the file, and select the second device from one or more user devices. The task streaming client generally provides a user interface for the user to search, view, select, and/or identify files stored across networked storage device(s) 204a and other local storage device(s) 204b. Using the task streaming client, a user can specify/identify a file and operation to be performed on the file such that a task-context metadata tag can be generated and streamed to a second user device. The task streaming client may transmit the task-context as a task-context metadata tag identifying the file, the operation, and the second device, to enable the task streaming manager 208 to notify the second user device of the task-context metadata tag using a task streaming client on the second user device.

Task streaming management system 200 enables the unification of data/files and capabilities of user devices such that task-contexts can be streamed over many devices. In particular, one or more user devices 206 are provisioned with a task streaming client configured to provide metadata for identifying one or more files stored on the first device and one or more user preferences associated with capability(-ies) of the user device for operating on different types of files. The task streaming client is an application running on the user device (i.e., instructions/logic stored on non-transitory computer-readable media executable by the device), or is an application (e.g., as a hosted application) provided over the network 202 and viewable/usable via the user device.

To provide a unified view of data/files stored across networked storage device(s) 204a and other local storage device(s) 204b, a listener may be provided on user devices 206 (e.g., as part of the task streaming client) to monitor/collect metadata associated with files stored on local storage devices and any updates to such metadata and to transmit the metadata and any updates to task streaming manager 208. The listener is configured to detect modifications, additions, and/or deletions to the metadata (as a result of changes made to files stored in the local storage device), and if any updates are detected, the listener is further configured to transmit the update(s) to the task streaming manager. Furthermore, task streaming manager 208 may perform authentication with network storage device(s) 204a to retrieve metadata associated with files stored on network storage device(s) 204a. For instance, a user may provide login credentials to the network storage device(s) 204a via the task streaming client on a user device, and the task streaming client provides the login credentials to task streaming manager 208. Accordingly, task streaming manager 208 can access (e.g., through one or more application programming interfaces (APIs)) files stored on network storage device(s) 204a and retrieve metadata associated with those files.

To provide a unified view of capabilities across a plurality of user devices, the listener may also collect one or more user preferences associated with capabilities of the user device for operating on different types of files, and transmit those user preferences to task streaming manager 208. Within the context of the disclosure, a user preference associated with a capability of a user device specifies what particular operation is (natively) available for operating on a particular type of file (e.g., executing a PDF reader is available for reading a PDF document, running an anti-virus scanner is available for scanning a.exe file, etc.). Task streaming manager 208 may provide a local copy of available operations of various user devices for operating on different types of files to a user device. Accordingly, the task streaming client can display to a user available operations for a particular user device for operating on a particular file when creating a task-context for streaming to another device. The listener is configured to detect modifications, additions, and/or deletions to the user preferences (as a result of changes made to configuration of the user device), and if any updates are detected, the listener is further configured to transmit the update(s) to the task streaming manager.

Available Operations Vs. User Preferences

In some cases, the set of available operations for a particular user device may differ from the set of user preferences for the user device. This may occur if a file can be converted to a different format where other operation(s) become available for operating on the converted file using the user device. The task streaming manager 208 (in some cases the user devices themselves) may have one or more capabilities for reconciling differences in user preferences between devices to allow task streaming to occur seamlessly. These capabilities may include the capability to convert a file from one format to another format that is more suitable for the target user device. For instance, a user device may have a user preference for executing a PDF reader to read a PDF file. However, the available operations may include executing a PDF reader to read a PDF file converted from a Word document, executing a PDF reader to read a PDF file converted from a PowerPoint document, and executing a PDF reader to read a PDF file, etc., if task streaming manager 208 or user device(s) 206 has the capability to convert a Word document to a PDF file or the capability to convert a PowerPoint document to a PDF file. Task streaming manager 208 may provide the user preferences of various user devices to the task streaming client of a user device as "available operations" for the various user devices for operating on different types of files. Specifically, the "available operations" takes into account any conversion capabilities for reconciling difference(s) between an operation identified in the task context and the user preferences of the target device.

According to one aspect of the disclosure, the task streaming manager may generate the available operation(s) of the second device for operating on different types of files based on the one or more user preferences of associated with capability(-ies) of the second device and one or more capabilities (of the task streaming manager or some other user device) for converting the file to a format suitable for some of the one or more user preferences associated with capability(-ies) of the second device. If the task streaming manager is to convert the file, the task streaming manager may retrieve the file, convert the file, at the task streaming manager, to a format suitable for some of the one or more user preferences associated with capability(-ies) of the second device using the one or more capabilities of the task streaming manager, and provide the second task streaming client access to the converted file.

The management of user preferences and available operations is one of the few differences between the concept of task streaming and traditional file sharing systems. Instead of simply providing a way to transmit a file to a target device (leaving it to guess-work whether the target device can actually operate on the file), the task streaming manager 208 takes into account the user preferences associated with capabilities for operating on the file of the target device as well as any conversion capabilities available for the file.

Maintaining a Global View

The task streaming manager manages and maintains a global view, i.e., a database comprising metadata of files stored across many devices and user preferences of those devices. Updates to the metadata identifying the files and user preferences are also received and maintained as part of the global view. This feature advantageously allows a global view of the files and capabilities stored on both networked storage device(s) 204a and local storage device(s) 204b to be maintained even when one or more of these storage devices go offline or becomes temporarily unavailable.

The task streaming manager may optionally push a copy of the global view and any updates to the global view of the metadata of files stored on networked storage device(s) 204a and local storage devices 204b and user preferences of user devices 206 to a local cache at each one of user devices 206 such that the user devices can individually maintain a local copy of the global view. In other words, a first task streaming client is configured to receive metadata associated with files stored on the local storage device of a second device and/or one or more networked storage devices. Furthermore, the first task streaming client is configured to receive from the task streaming manager, available operation(s) associated with capability(-ies) of the second device for operating on different types of files. Moreover, the first task streaming client is configured to receive from the task streaming manager, one or more of the following: (i) update(s) to metadata associated with files stored on the second device, (ii) update(s) to metadata associated with files stored on one or more networked storage devices; and (iii) update(s) to available operations associated with the capability(-ies) of the second device for operating on different types of files. This local caching mechanism allows the user devices 206 to have a global view of the files and capabilities even when one or more user devices becomes temporarily disconnected from task streaming manager 208, when task streaming manager 208 is offline, or when task streaming manager becomes temporarily unavailable. The unified view of the user data footprint is available on every device the user owns/registers with zero configuration. That is, once the user initializes the global view on one device, the same view and same controls are available on any device the user uses the task streaming system on.

In some embodiments, the global view maintains presence data of the user devices 206, which keeps track of the online/offline state of the user devices. Furthermore, in some embodiments, the task streaming manager 208 takes the responsibility to maintain data consistency of the global view and local cached copies of the global view. Note that the viewing of a listing of files stored across the plurality of devices and searching of those files will work even when the devices are offline, to the level of the data consistency before the device went offline.

File Transfer: Cloud to Target Device Vs. Peer-to-Peer

Streaming a task-context generally means identifying a file, an operation, and a target user device for performing the operation on the file. Generally speaking, the task streaming manager 208 of FIG. 2 serves as the proxy for receiving task-context metadata tags and providing the task-context metadata tags to the target user device. However, various scenarios may exist for making the file available for the target user device, which may or may not involve the task streaming manager 208.

In a first scenario, the file identified by the task-context may already be present at a local storage device of the target user device. In this case, no file transfer is needed. The target user device may perform the operation as identified by the task-context.

In a second scenario, if a task-context being streamed to a user device identifies a file stored on a networked storage device, the target user device may download that file from the networked storage device via network(s) 202 of FIG. 2, e.g., the Internet. Upon downloading the file from the networked storage device, the target user device may perform the identified operation.

In a third scenario, if a task-context being streamed to the user device identifies a file stored on a local storage device (at a user device that is remote from the target user device), the target user device may download that file (directly) from the local storage device to complete the task, e.g., via a local area network or an Intranet. Upon downloading the file, the target user device may perform the identified operation.

In a fourth scenario, if a conversion is needed before the identified operation can be performed, the task streaming manager may retrieve the file from the storage device in which the file is stored, and provide that file to an entity capable of making the conversion. The entity may be the task streaming manager itself or any suitable user device with the capability of converting the file. Alternatively, the task streaming manager does not retrieve the file, but cause the file to be transmitted to the entity capable of making the conversion. Then, the target user device receives the converted file and can then perform the identified operation.

In a fifth scenario, the task streaming manager maintains detailed information in the cloud about latest activity on any of the devices or cloud storage services, e.g., a modification to a file, new file, or addition of a tag. The system can automatically transfer the files with the latest changes so that they are available on all the devices or made accessible to all the devices, subject to policies optimizing transmission costs. With this facility, the data file needed for specific task-contexts is available in the target device before the task-context is created. Thus, the task-context execution on the target device becomes more efficient without having to wait for the data transfer.

Providing a Virtual Personal Cloud

Figure 3:
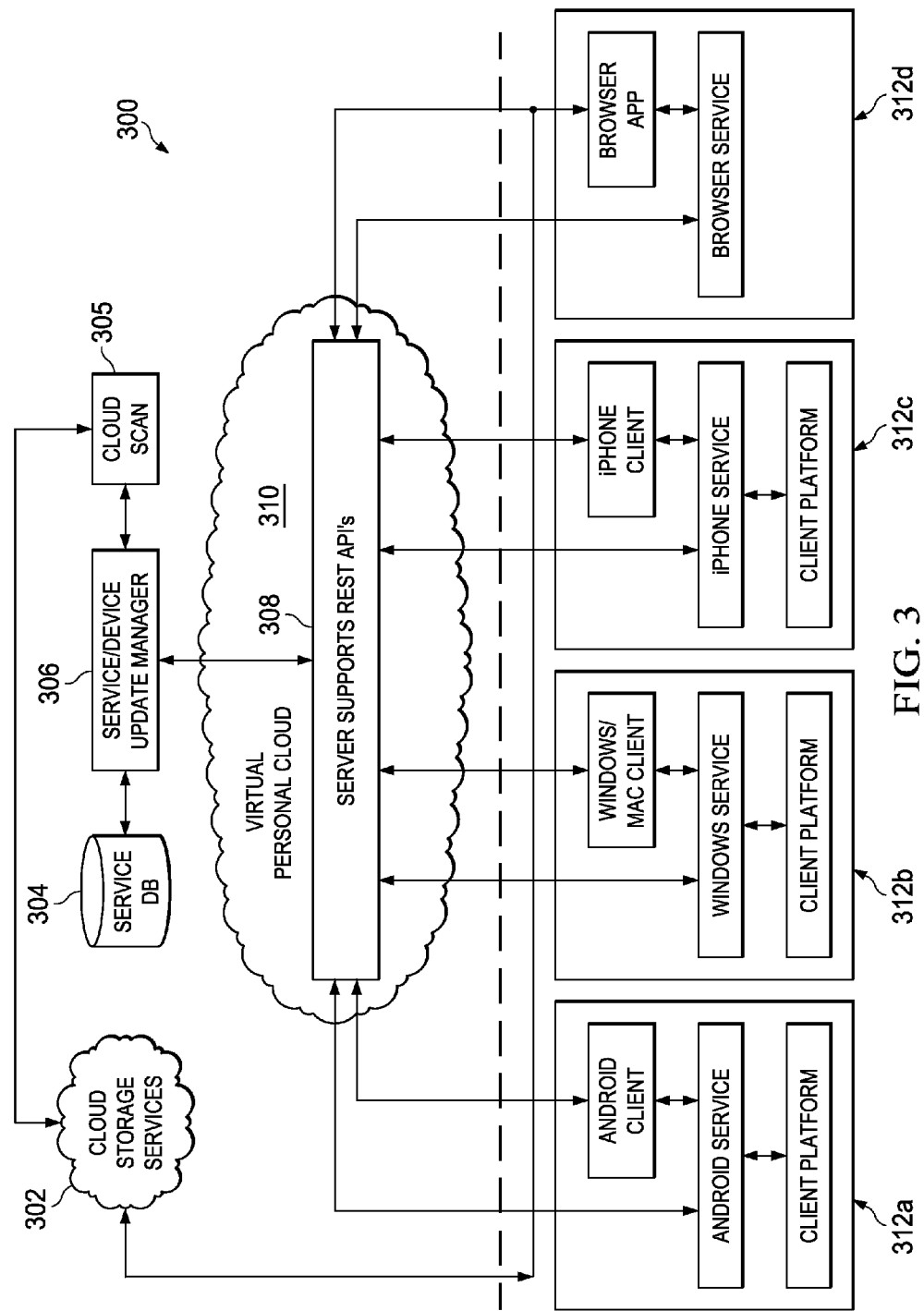
FIG. 3 is a block diagram of a task-context streaming architecture according to some embodiments of the disclosure.

FIG. 3 is a block diagram of a task-context streaming architecture according to some embodiments of the disclosure. This example demonstrates the ability to map and provide uniform and "location-agnostic" access for data across several user devices and storage services. FIG. 3 demonstrates how, in an example, a collection of interacting clients and a cloud services can provide a 'virtual personal cloud' 310 of all the data the user owns. The virtual personal cloud 310, the result of providing the task streaming manager 208 of FIG. 2, provides the ability to search and access data independent of the location of the data. The mechanism has many uses in data management, including task streaming in accordance with the present specification.

The exemplary system 300 shows various data flows for providing task streaming. System 300 comprises cloud storage services 302 (corresponding to networked storage device(s) 204*a* of FIG. 2), service database (DB) 304, service/device update manager 306, server supports Representational State Transfer Application Programming Interfaces (REST API's) 308, user devices 312*a-d*. Service DB 304, service/device update manager 306, server supports REST API's 308 are components of task streaming manager 208 of FIG. 2. Together, these components manages metadata identifying files stored on user devices 312*a-d* and user preferences associated with capability(-ies) of user devices 312*a-d* for operating on different types of files. The metadata and user preferences are provided by user devices 312*a-d* (illustrated by arrows to server supports REST API's 308) to the task streaming manager, and the metadata data and user preferences may be stored in service DB 304, and the maintenance/updates of the metadata and user preferences may be managed by service/device update manager 306. The global view of the metadata and user preferences may be provided to each user device 312*a*-312*d* through the server supports REST API's 308. Cloud scan 305 may be further provided to use login credentials (gathered by the task streaming manager from users using task streaming clients) to retrieve metadata associated with files stored in cloud storage services 302. In some embodiments, user provided metadata tags (e.g., via user input using the task streaming clients) may also be stored and managed in service DB 304.

The components also allow task-contexts metadata tags to be provided from one user device to another user device via the virtual personal cloud 312. FIG. 3 illustrates that user devices 312*a-c* may operate on different platforms (e.g., Android, Windows, iPhone, etc.) but are each equipped with a "client platform" for providing a task streaming client suitable for cooperating with the server 308. User device 312*d* uses a browser to access features of the task streaming client (instead of using a "client platform"). The task streaming client in this case is provided to user device 312*d* as a hosted application. Furthermore, FIG. 3 illustrates that any of user devices 312*a*-312*d* may directly download the identified file of a task-context from cloud storage services 302 or from a user device with which the identified file is stored.

Queuing Task-Context Metadata Tags in a Task List

Besides providing metadata and user preferences associated with capabilities of a user device to the virtual personal cloud 312, task streaming clients can use the virtual personal cloud 312 to keep track of task-contexts. User devices may transmit task-context metadata tags through the server supports REST API's 308 and service/device update manager 306 to service database (DB) 304. Service DB 304 may be configured to store and queue task-context metadata tags being transmitted from a first task streaming clients targeted for a second task streaming client. For instance, service DB 304 may queue received task-context metadata tags in a task list. When a task streaming manager receives a task-context metadata tag, the task streaming manager may add the task-context metadata tag to a task list associated with the second task streaming client, wherein the task list is stored in service DB 304. The task list may maintain all the task(s) targeted for the second task streaming client when the second device is not communicating with the task streaming manager (i.e., when the second task streaming client is offline). When the second when the second device communicably connects with the task streaming manager, the task streaming manager may then push the task list associated with the second device to notify the second device of the task-context metadata tag (or the second device may pull the task list from the task streaming manager).

In some embodiments, task-context metadata tags may be taken out of the queue if the task streaming manager receives a notification from the second device that the task-context has been successfully streamed to the second device.

Example User Interface for Creating a Task-Context

Figure 4:
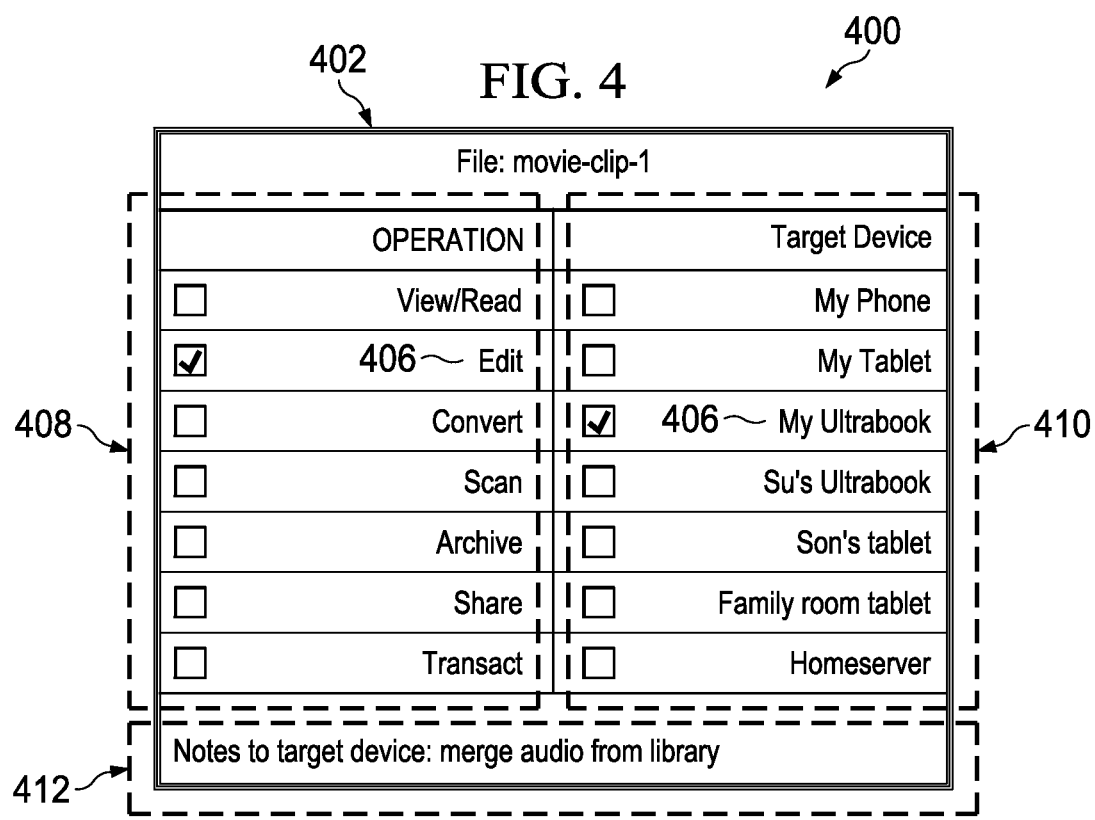
FIG. 4 is a user interface element for a task-context streaming system according to one or more example embodiments of the present specification.

FIG. 4 is a user interface element 400 for a task-context streaming system according to one or more example embodiments of the present specification. This user interface 400 element may be provided by a first task streaming client running on a first device. The task-context specifies the data file "movie-clip-1" (shown in user interface part 402) and an operation "edit" (shown in user interface part 404) to be completed in the target device "my ultrabook" and the preferred target device "my ultrabook" (shown in user interface part 406).

The file "movie-clip-1" may be selected from a plurality of files stored on a plurality of devices (across many locations). The files may include files stored on the first device, files stored on the target device, and/or one or more networked storage devices. The location-agnostic aspect of the task streaming system allows files from a plurality of devices to be viewed and searched. In particular, a task streaming manager collects metadata identifying files stored across the plurality of devices from the devices, and provides the metadata to the first task streaming client running on the first device. Using the metadata, the first task streaming client running on the first device can render a listing of files stored across the plurality of devices for display through the user interface element.

Besides providing metadata, the task streaming manager determines available(s) operations associated with various user devices based on user preferences associated with capabilities of the various user devices. The task streaming manager may provide the available operation(s) associated with various user devices to the first task streaming client. Upon receiving a selection of the file, the first task streaming client may determine the available operation(s) suitable for operating on the file by the second device based on the type of the file (e.g., using metadata of the file, or the file extension of the file). After determining the available operations, the first task streaming client may render, for displaying on the user interface element, the available operation(s) (see box 408) suitable for operating on the particular file. The user interface element, in particular box 408, enables a user at the first task streaming client to select one or more of the available operation(s) as the operation. The operations shown are merely illustrative, and may differ depending on the application, the file, and the target device.

The first streaming client may determine a listing of possible target devices, e.g., user devices belonging to the user or a group of users. The first task streaming client may then render for display the listing of possible target devices (see box 410). The first streaming client may determine the listing based on received metadata for identifying files of the various user devices, or based on information provided by the task streaming manager. These user devices may have previously registered onto the task streaming system as a possible target device as being a group of user devices associated with a particular user, a particular group of users, a household, an organization, etc. The possible target devices shown are merely illustrative, and may differ depending on the application, the file, and a selected operation.

The user interface element of FIG. 4 may provide a way to disable certain operations or certain target devices (or to show those operations and target devices as being unavailable). This is useful in two scenarios. In a first scenarios, a user may select an operation which is not an available operation on some of the target devices. Those target devices may be "disabled", grayed out, or made not available or invisible on the user interface element. In a second scenarios, a user may select a target device which does not have some of the available operations. Those available operations may be "disabled", grayed out, or made not available or invisible on the user interface element.

Using this user interface element, a user can provide, using the first task streaming client on the first device, user selection(s) of a file, an operation to be performed on the second device with the file, and the second device, wherein the file is selected from a plurality of files stored on a plurality of devices and the operation is selected from available operation(s) of the target device for operating on the file. The second device may be selected from one or more user devices. Based on those selections, the first task streaming client can transmit a task-context metadata tag identifying the file, the operation, and the target device, to enable the task streaming manager to notify the target device of the task-context metadata tag using a second task streaming client on the target device.

In some embodiments, the user interface element shown in FIG. 4 provides a notes field 412, which allows a user to input a personal note as part of the task streaming metadata tag. In this example, the personal note recites "merge audio from library". When the task streaming manager notifies the target device of the task-context metadata tag, the target device also receives the personal note and may display the personal note to the user using the target device.

Notification System

A notification system may also be provided. According to one example, the notification system shows data and associated task-context on a targeted device, and a mechanism to notify other devices when notifications are consumed. When the task-context is created, the system forwards the task-context to the next device as a notification. The notification may be presented to the user when he is on the next device, and the notification is consumed when the user accomplishes the task. He might create another task-context targeting the following device. If the next device is offline, the task streaming manager may queue the notification.

Notifications may be implemented using various user interface techniques for displaying the notification to the user. For instance, a graphical user interface may indicate to the user of notifications present for a particular device (e.g., pop-up messages, indicator icon, message notification, etc.). Haptic, audio, other visual output may also be used to indicate the presence of notifications for a particular device (e.g., vibrate, sounds, indicator lights, etc.)

Interacting with a Plurality of Devices for Completing a Task

Figure 5:
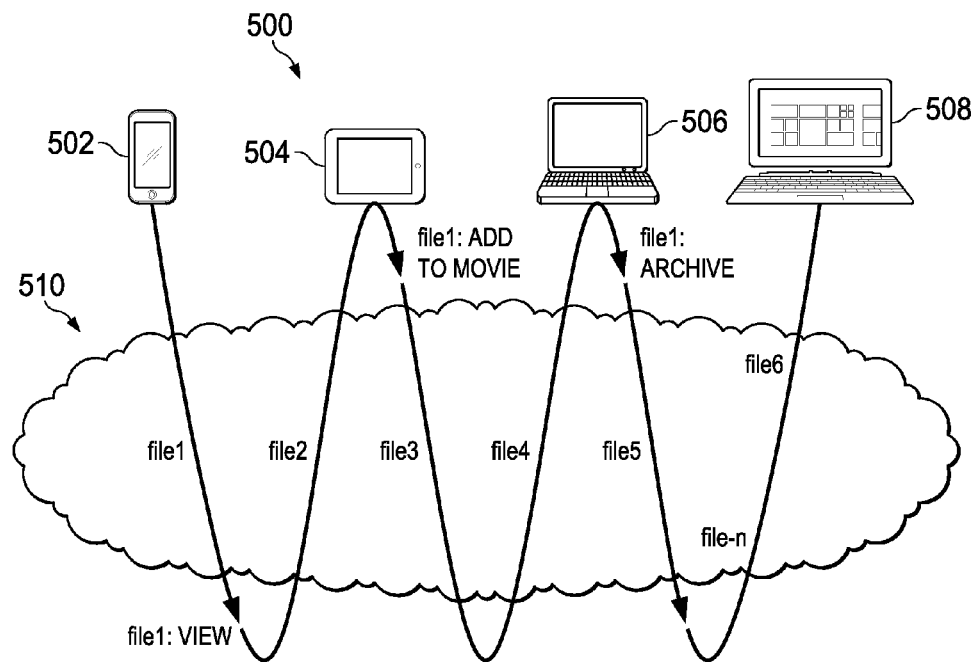
FIG. 5 is a diagram illustrating user interaction with a plurality of devices over a task-context architecture according to some embodiments of the disclosure.

In general the complete task may be accomplished by a series of task-contexts across devices. As an example, FIG. 5 is a diagram illustrating user interaction with a plurality of devices over a task-context architecture according to some embodiments of the disclosure. This diagram shows the task of editing and archiving a movie across devices. The task streaming system 500 comprises device 502, device 504, device 506, device 508, and virtual personal cloud 510. The virtual personal cloud 510, similar to virtual personal cloud 310 of FIG. 3, is provided by a task streaming manager to which a collection of task streaming clients of device 502, device 504, device 506, and device 508 has access. The virtual personal cloud 510 may make file1, file2, file 3 . . . file-n available to device 502, device 504, device 506, and device 508. Using device 502, a user may create a first task-context "file1: view" for device 504. Using device 504, the user may create a second task-context "file1: add to movie" for device 506. Using device 506, the user may create a third task-context "file1: archive" for device 508. Through the series of task-contexts, the user is able to seamlessly operate on file1 across different devices utilizing preferred devices for particular operations.

Global Task List and Task Plug-Ins

The present disclosure describes a mechanism for creating a global task list in the cloud and sync it across a plurality of devices according to one or more example embodiments of the present specification. Accordingly, the task streaming manager maintains the global task list in the cloud by storing task-context metadata tags received from any one of the user devices. The global task list comprises a plurality of tasks created, with each task taking the following form in one example embodiment: Task<Task Name, target device(s), data, Task status>. The task streaming manager may maintain this global task list for a plurality of user devices in the "cloud". Advantageously, the task-contexts can be maintained even when one or more of the (target) user devices are offline.

Figure 6:
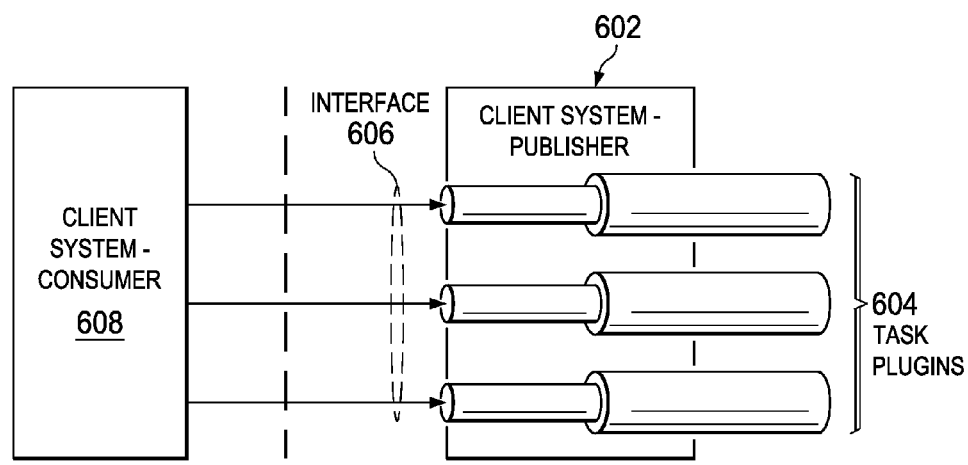
FIG. 6 is a block diagram disclosing an interface for task plugins, which provides a mechanism to create a global task list in the cloud and sync it across a plurality of devices according to some embodiments of the disclosure.

FIG. 6 is a block diagram showing an interface for task plugins, which provides a mechanism to create a global task list in the cloud and sync it across a plurality of devices according to some embodiments of the disclosure. A mechanism to publish capabilities of various devices and interface to access them may be provided. A "client system-publisher" user device 602 may include a task plugin for each kind of task (or operation) (illustrated as "task plugins" 604). The plugin may publish an interface 606 through which "client system-consumer" user device 608 can request the task. Though this mechanism, the task streaming manager and task streaming clients can obtain information related to the capabilities (e.g., user preferences associated with capabilities on various devices) and have an interface to execute operations using those capabilities. In an example embodiment, the interface may take the following form: TaskPublish<task name, description, parameters>. For instance, a request for a task-context to publish a photograph may be as follows: EditPhoto<EditPhoto, "edits photo", Redeye/auto-enhance/filter-xxx/downsample-web>. This interface between the user devices effectively enables one user device to access capabilities of another user device.

Architecture of Task Streaming Clients

Figure 7:
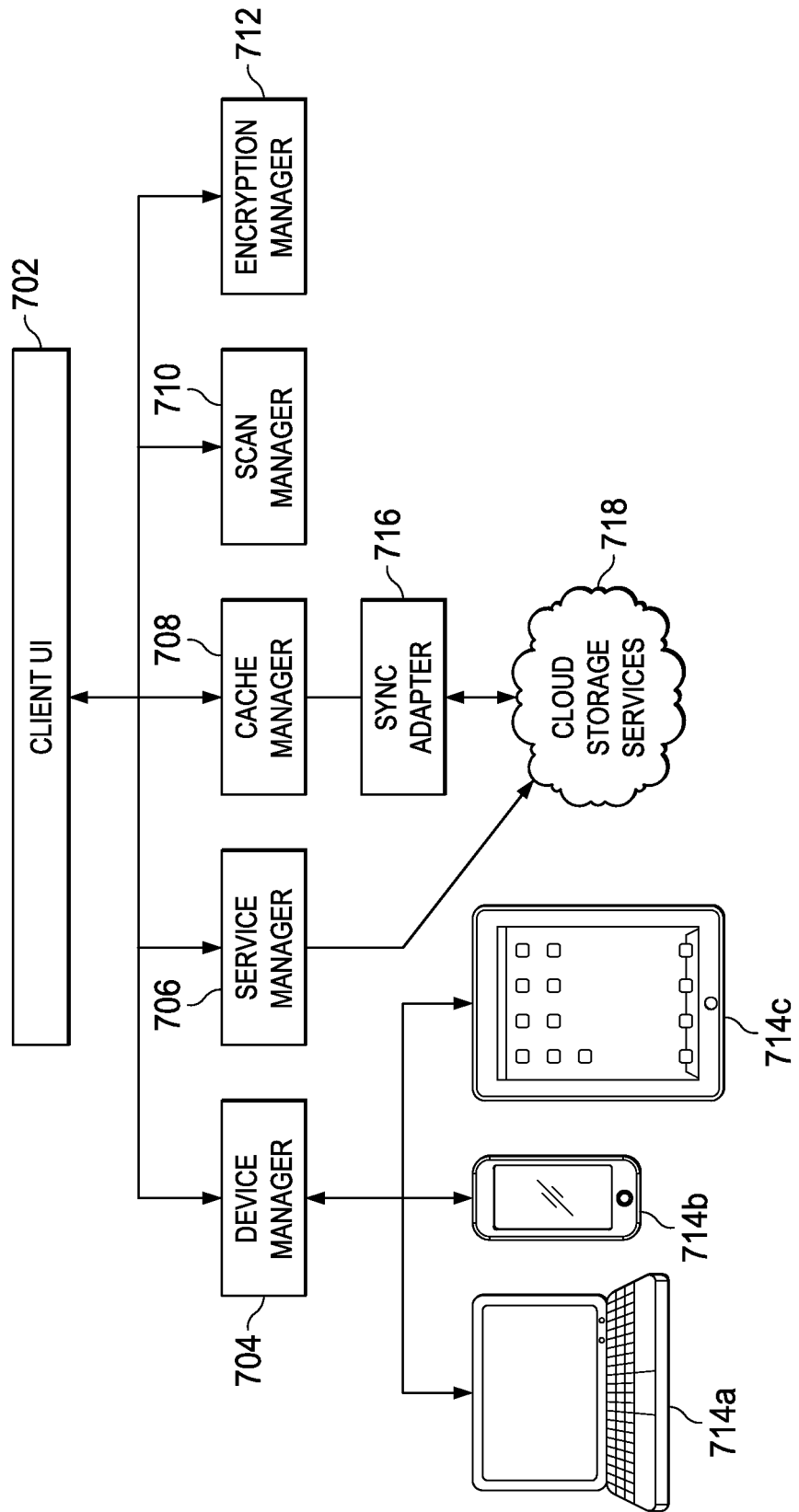
FIG. 7 is a block diagram of a task streaming client according to some embodiments of the disclosure.

FIG. 7 is a block diagram of an exemplary task streaming client for a user device according to some embodiments of the disclosure. An exemplary task streaming client includes a client user interface (UI) 702, a device manager 704, a service manager 706, a cache manager 708, a scan manager 710, and an encryption manager.

The client UI allows the user to view/search files stored across many devices, and to create a task-context. In some embodiments, the client UI provides a user interface element configured to receive login credentials at the first task streaming client at the first device. The client may then provide the login credentials from the first task streaming client to the task streaming manager to allow the task streaming manager to retrieve metadata associated with files stored on one or more networked storage devices.

The device manager 704 (similar to the listener described herein) is configured to gather metadata identifying files stored on the local storage device of a user device such as devices 714*a-c*. The device manager 704 may also be configured to gather updates to the metadata. The device manager may also gather user preferences associated with capabilities of the user device and any updates thereto.

The service manager 706 is generally configured to gather user input related to a task-context and creating that task-context metadata tag. The metadata tag may then be provided to task streaming manager residing in cloud storage services 718. The service manager 706 may also be used to notify the user if the user device has been identified as a target device for a task-context. The service manager 706 may be used to notify to cloud storage services 718 once the task for a task-context is complete.

The cache manager 708 maintains a cache of metadata and available operations on different types of files by various user devices. The task streaming client may include a sync adapter to ensure that the cache of metadata and available operations at a task streaming client is up-to-date with a global view of the metadata and available operations at the task streaming manager residing in cloud storage services 718.

The scan manager 710 may be optionally provided at the task streaming client to check whether a file identified by a task-context is safe for the user device. The encryption manager 712 may be optionally provided to decrypt an encrypted file identified by a task-context. The encryption manager 712 encrypt task-contexts, metadata, user preferences, and any other data traversing between the task streaming manager and a task streaming client to provide added security.

Management of Cross-Device User Preferences; Intelligent Automation of Task Contexts Users tend to have natural preference to certain applications for accomplishing certain tasks, either because of familiarity, features or training. For instance, one might prefer Windows Media Player for playing audio tracks on PC, but prefer VLC player for conversion between audio formats, or prefer audacity to edit the track. Thus, multipurpose Internet Mail Extension (MIME)-type based application selection or indication of content type fails to capture the user context and preference. In a cross device environment, the choice of device and the choice of an operation to be performed with the chosen device adds a new dimension. The end result of providing task streaming is a cross-device ability to map a data file to an application on a specific device based on intent and preference.

As the user interacts with the data on a device, data may be is collected along with any device configuration parameters to determine user preference associated with capabilities of the device. A user may also manually define these user preferences. Within the context of this disclosure, "Intent" refers to an operation that the user intends to perform with the data. A vocabulary of typical operations may be predefined and extensible by the user and the user community. Intents include but are not limited to "play", "edit", "read", "secure", "encrypt", "archive", "share" so on. First device in the list is the first choice for the action.

Figure 8:
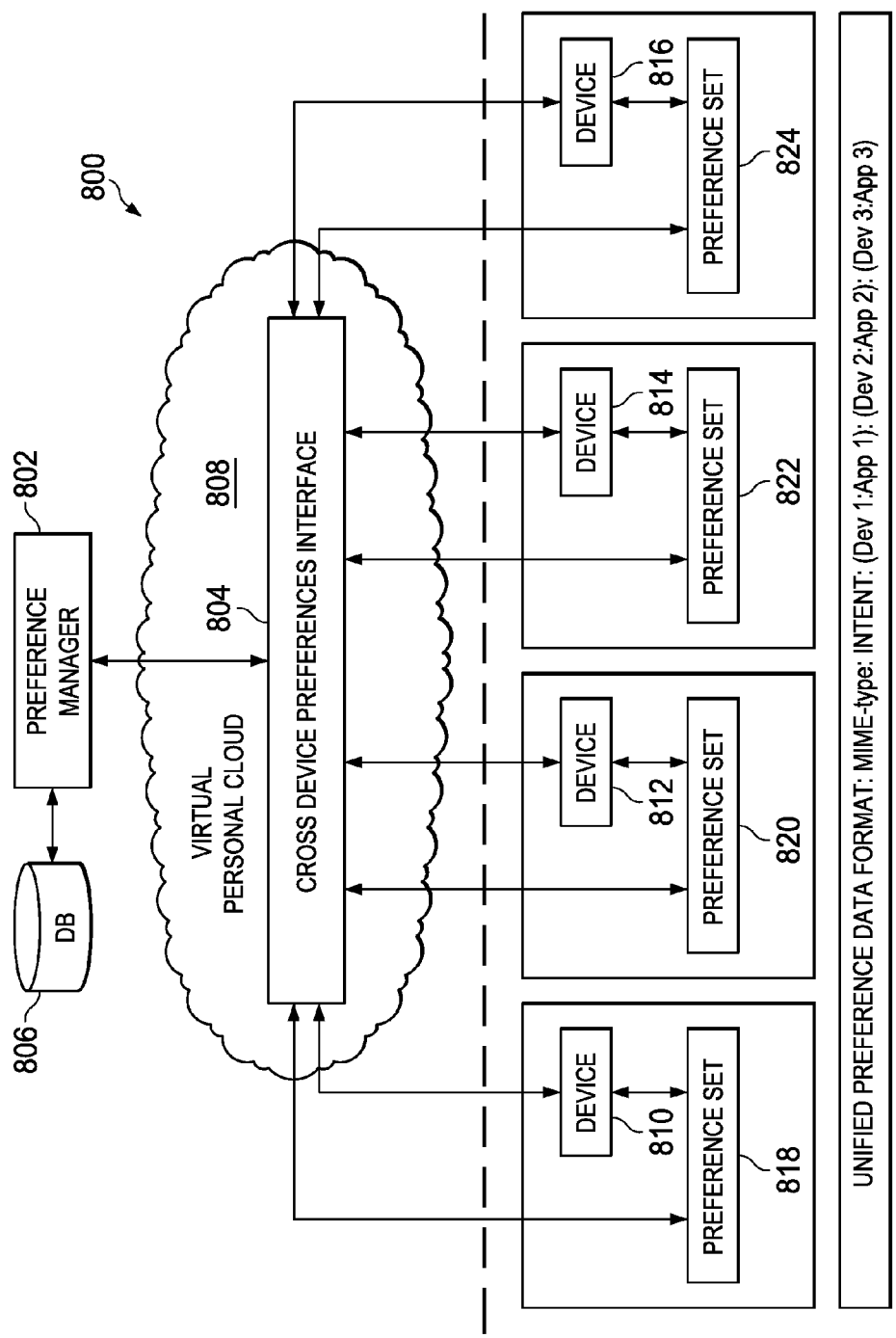
FIG. 8 is a block diagram illustrating management of cross device preferences according to some embodiments of the disclosure.

FIG. 8 is a block diagram illustrating management of cross device preferences according to some embodiments of the disclosure. The system 800 shown in FIG. 8 comprises a preference manager 802 (e.g., as part of a task streaming manager), a cross device preferences interface 804 and a database 806 for storing user preferences within a virtual personal cloud 808. Device 810, device 812, device 814, and device 816 each maintain a respective preference set, i.e., preference set 818, preference set 820, preference set 822, and preference set 824. Each preference set may include one or more user preferences associated with capabilities of the respective user device for operating on different types of files.

The user devices may provide via respective task streaming clients the preference sets 818, 820, 822, and 824 through cross device preferences interface 804 to the virtual personal cloud 808. The preference manager 802 may then collate the user preferences from the user devices to generate a unified user preference which takes into account the device and the application which are preferred for performing a particular operation on a particular type of file.

An example unified user preference may have the following data format: MIME-type: Intent: (Dev 1: App 1): (Dev 2: App 2): (Dev 3: App 3). The unified user preference thus defines an intent of using Dev 1 (device 1) and App 1 (application 1) for a particular type of file (MIME-type), using Dev 2 (device 2) and App 2 (application 2) for the same type of file (MIME-type), and using Dev 3 (device 3) and App 3 (application 3) for the same type of file (MIME-type). This data format conveys several pieces of information. For instance, this data format allows the task streaming manager to determine which devices are capable of performing a particular operation/intent on a file having a particular MIME-type. Furthermore, this data format allows the task streaming manager to determine which application is to be executed to perform the particular operation/intent on the file having the particular MIME-type. If the unified user preference comprises a ranked list of device and application pairs (e.g., (Dev X: App Y)), the task streaming manager may even select a particular device/application pair by default or make a suggestion to the user to use the particular device/application pair. Such a ranked list of device and application pairs may derived from historical user data (e.g., how often a particular device and application is used for a particular type of file). Alternatively or additionally, the user may manually provide the ranking This information can be used advantageously in 'task streaming" to intelligently and automatically route task contexts to appropriate devices and to create appropriate notifications on the target devices (and alleviating the need for the user to specify the target device and application when the preference manager 802 can derive the user preference for the target device and application to perform a specific operation). For example, when the user select a music file and selects the Intent to edit, the system automatically recommends user's PC with Audacity application, as an example, as the targets as derived from the preferences in the cloud. The user might choose something else, but over time the recommendation will capture the user preferences.

Illustrative Screenshots

Figure 9A:
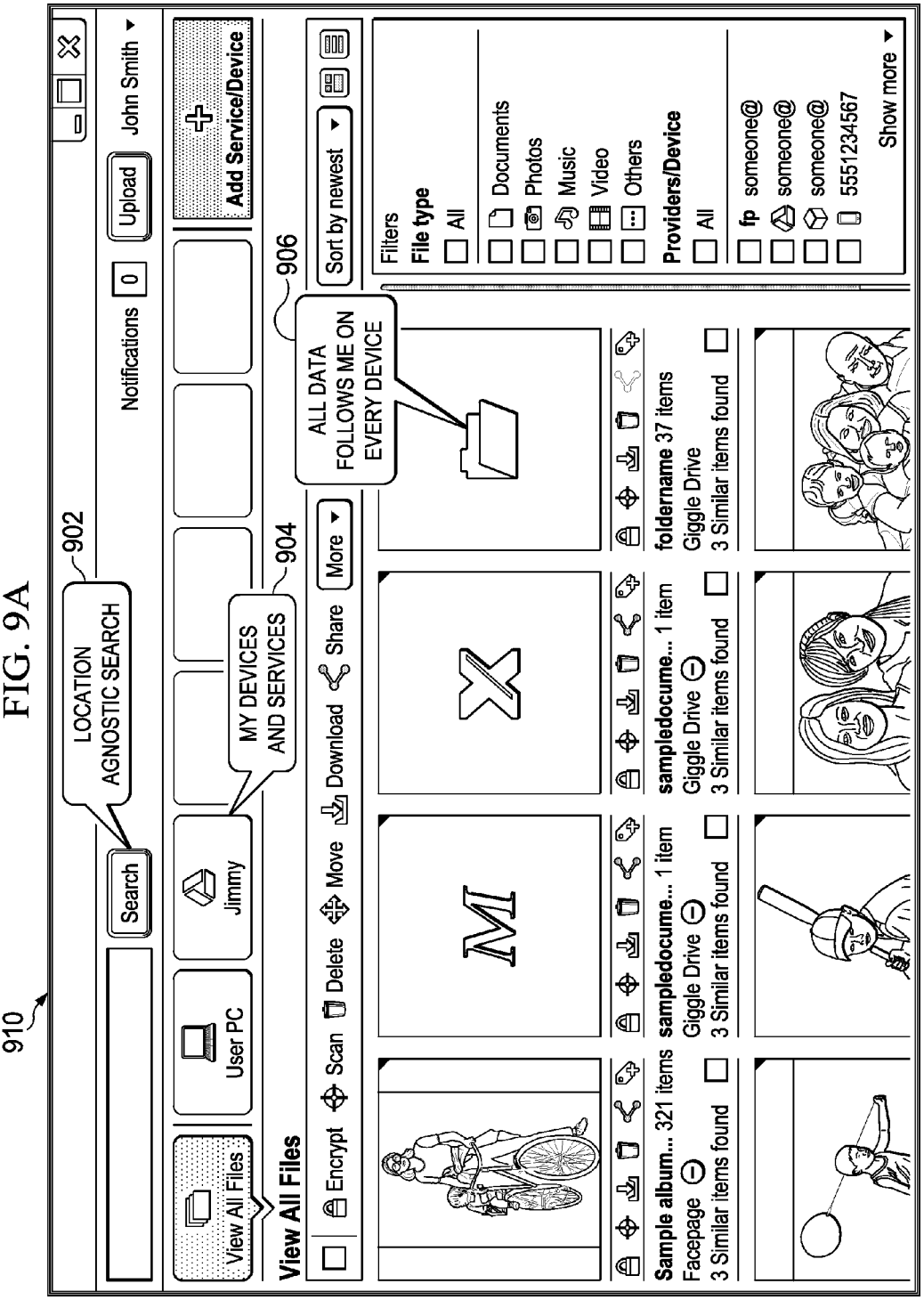
FIG. 9A-C are illustrative screen shots of a client which provides the user with a user interface to search files and stream tasks across different devices; according to some embodiments of the disclosure.
Figure 9B:
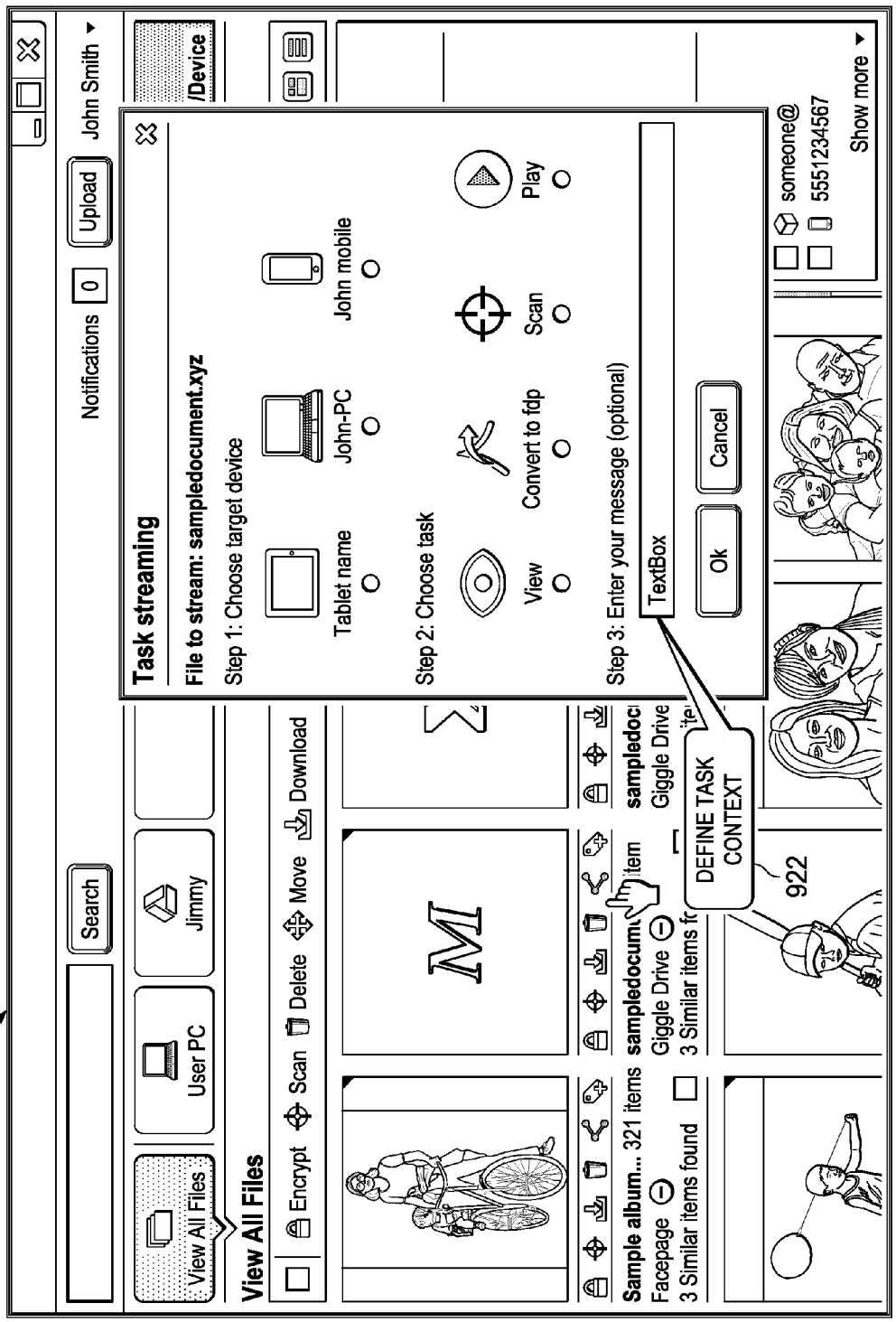
Figure 9C:
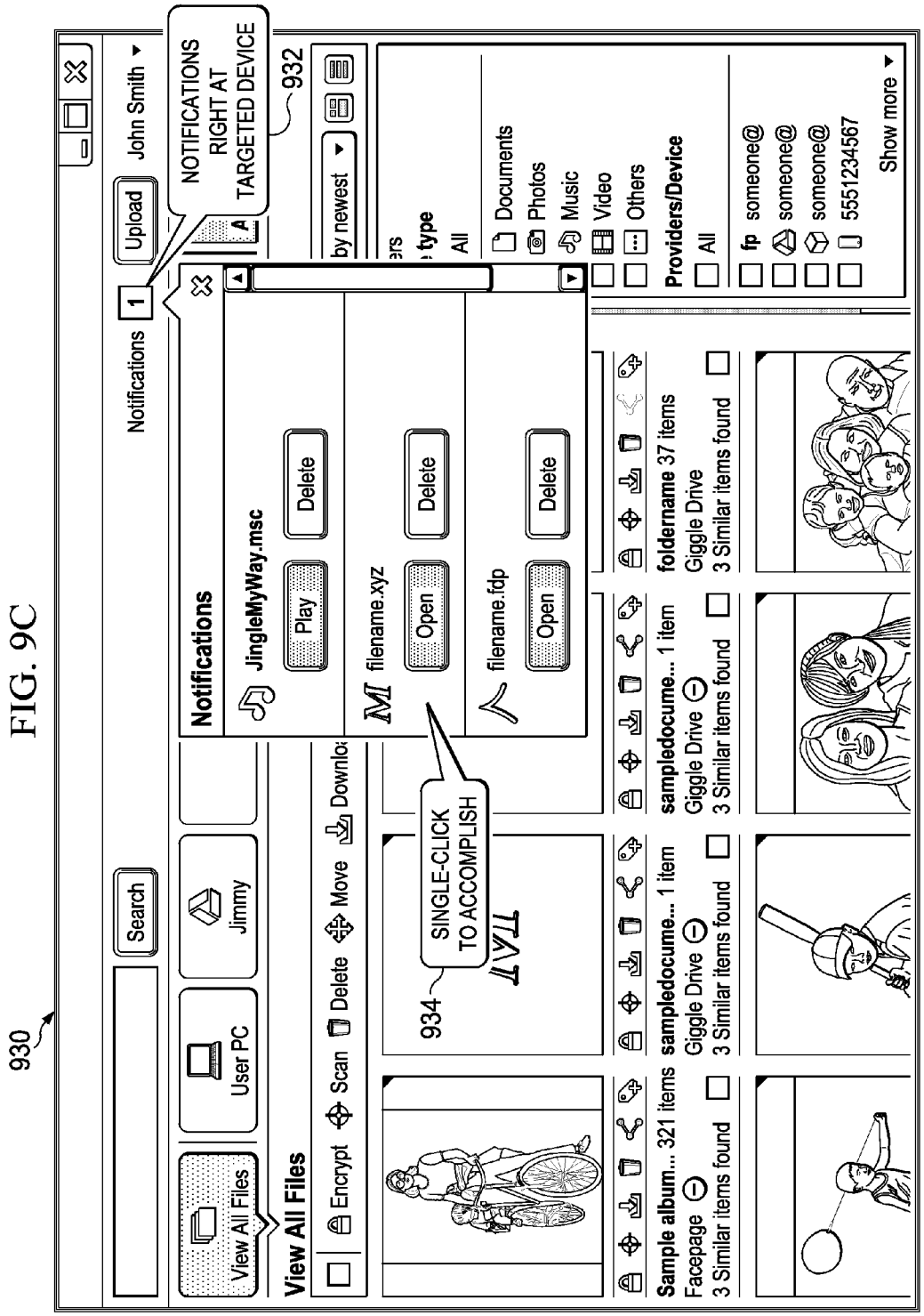

FIG. 9A-C are illustrative screen shots of a client which provides the user with a user interface to search files and stream tasks across different devices; according to some embodiments of the disclosure. In screenshot 910 of FIG. 9A, several user interface elements of an exemplary task streaming client are illustrated. According to one aspect, a search field is provided to allow a user to search through metadata identifying files stored across a plurality devices ("location agnostic search 902"). This searchable metadata may even include user-specified metadata tags used in categorizing or labeling the files. According to another aspect, the user may view all files, or files associated with different storage devices individually ("my devices and services 904"). According to yet another aspect, the user may view the same set of files using any one of the task streaming clients on the user devices ("all data follows me on every device 906").

In screenshot 920 of FIG. 9B, a task streaming client provides a user interface part to allow the user to define a task-context ("define task context 922") upon selecting a file from a plurality of files from various devices. The user interface part gives the user an opportunity to select a target device, then select a task/operation for operation on the selected file to define the task-context. A field is provided to allow the user to optionally provide a message for the task-context as well, so that the user can add any personal notes for the task-context.

In screenshot 930 of FIG. 9C, a user interface part of the task streaming client at the target device displays a notification of a task-context targeted to that target device ("notifications right at targeted device 932"). The task streaming client at the target device renders the notification of the task-context metadata tag for display on the second device. Furthermore, a user interface part provides a single-click user interface element to execute the operation. The task streaming client at the target user interface optionally provides a user interface to allow a user to indicate an acceptance to execute the operation on the file as identified by the task-context metadata tag. In response to receiving a click to accept through the user interface, the task streaming client at the target device may then execute, using the second device, the operation on the file as identified by the task-context metadata tag. The task streaming client may execute the operation using an application identified by user preferences associated with capabilities of the target device.

System Illustrations

Figure 10:
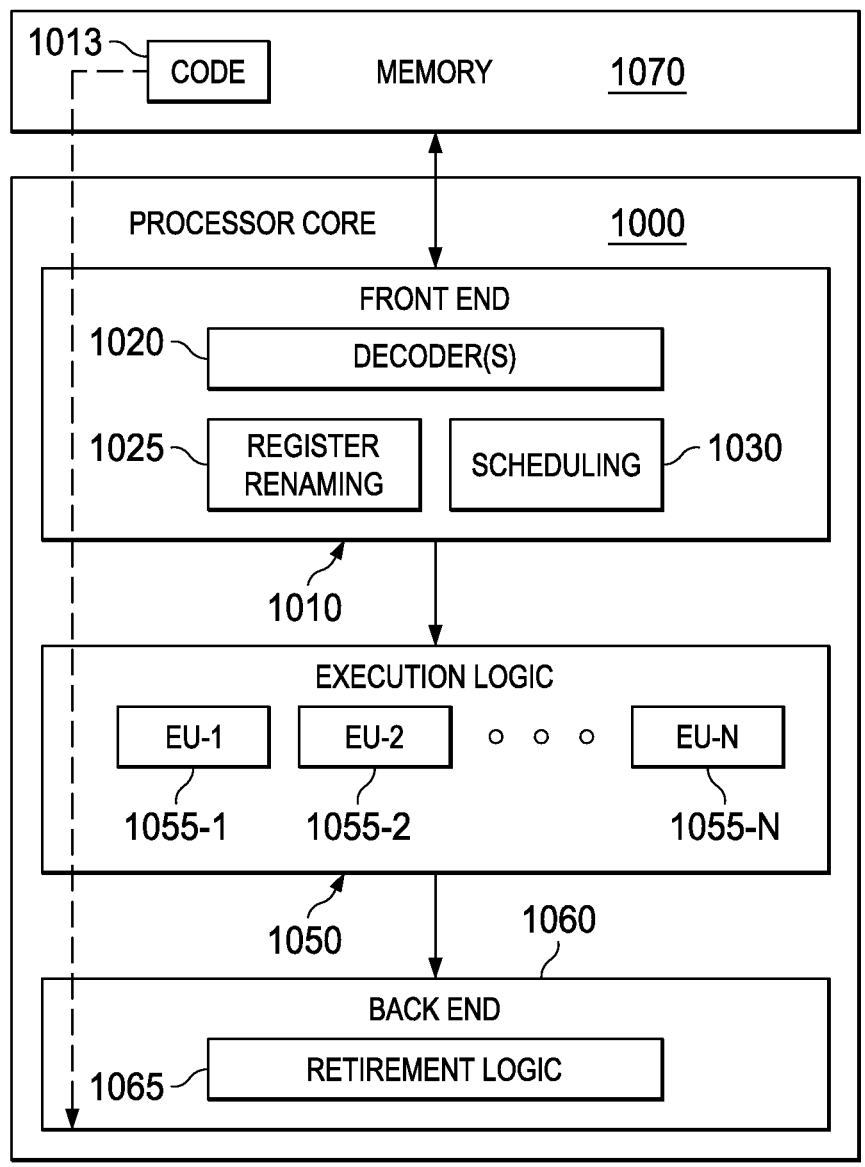
FIG. 10 is a block diagram of a memory coupled to an example processor according to an embodiment.

FIG. 10 is a block diagram of a memory coupled to an example processor according to an embodiment. FIG. 10 illustrates a processor core 1000 according to one embodiment. Processor core 1000 may be the core for any type of processor, such as a micro-processor, an embedded processor, a digital signal processor (DSP), a network processor, or other device to execute code. Although only one processor core 1000 is illustrated in FIG. 10, a processing element may alternatively include more than one of the processor core 1000 illustrated in FIG. 10. (See, e.g., multi-core embodiments in FIG. 12, below). Processor 1000 may be any type of processor, such as a microprocessor, an embedded processor, a digital signal processor (DSP), a network processor, a multi-core processor, a single core processor, or other device to execute code. Processor core 1000 may be a single-threaded core or, for at least one embodiment, the processor core 1000 may be multithreaded in that it may include more than one hardware thread context (or "logical processor") per core. Such cores 1000 may be configured to execute instruction code in a manner disclosed herein. This system shown in FIG. 10 may be used to carry out the functions describe herein to be performed by user devices, task streaming clients, task streaming managers, and any components shown in FIGS. 1A-B, 2-3, and 5-8.

FIG. 10 also illustrates a memory 1070 coupled to the processor 1000. The memory 1070 may be any of a wide variety of memories (including various layers of memory hierarchy) as are known or otherwise available to those of skill in the art. The memory 1070 may include one or more code instruction(s) 1013 to be executed by the processor 1000 core. The processor core 1000 follows a program sequence of instructions indicated by the code 1013. Each instruction enters a front end portion 1010 and is processed by one or more decoders 1020. The decoder may generate as its output a micro operation such as a fixed width micro operation in a predefined format, or may generate other instructions, microinstructions, or control signals which reflect the original code instruction. The front end 1010 also includes register renaming logic 1025 and scheduling logic 1030, which generally allocate resources and queue the operation corresponding to the convert instruction for execution.

The processor 1000 is shown including execution logic 1050 having a set of execution units 1055-1 through 1055-N. Some embodiments may include a number of execution units dedicated to specific functions or sets of functions. Other embodiments may include only one execution unit or one execution unit that can perform a particular function. The execution logic 1050 performs the operations specified by code instructions.

After completion of execution of the operations specified by the code instructions, back end logic 1060 retires the instructions of the code 1013. In one embodiment, the processor 1000 allows out of order execution but requires in order retirement of instructions. Retirement logic x65 may take a variety of forms as known to those of skill in the art (e.g., re-order buffers or the like). In this manner, the processor core 1000 is transformed during execution of the code 1013, at least in terms of the output generated by the decoder, the hardware registers and tables utilized by the register renaming logic 1025, and any registers (not shown) modified by the execution logic 1050.

Although not illustrated in FIG. 10, a processing element may include other elements on chip with the processor core 1000. For example, a processing element may include memory control logic (see, e.g., MC 1172 of FIG. 11, below) along with the processor core 1100. The processing element may include I/O control logic and/or may include I/O control logic integrated with memory control logic. The processing element may also include one or more caches.

FIG. 11 is a block diagram of an example computing system that is arranged in a point-to-point (PtP) configuration according to an embodiment. Shown in FIG. 11 is a multiprocessor system 1100 that includes a first processing element 1170 and a second processing element 1180. While two processing elements 1170 and 1180 are shown, it is to be understood that an embodiment of system 1100 may also include only one such processing element. This system shown in FIG. 11 may be used to carry out the functions describe herein to be performed by user devices, task streaming clients, task streaming managers, and any components shown in FIGS. 1A-B, 2-3, and 5-8.

System 1100 is illustrated as a point-to-point interconnect system, wherein the first processing element 1170 and second processing element 1180 are coupled via a point-to-point interconnect 1150. It should be understood that any or all of the interconnects illustrated in FIG. 11 may be implemented as multi-drop bus rather than point-to-point interconnect.

As shown in FIG. 11, each of processing elements 1170 and 1180 may be multicore processors, including first and second processor cores (i.e., processor cores 1174a and 1174b and processor cores 1184a and 1184b). Such cores 1174, 1174b, 1184a, 1184b may be configured to execute instruction code in a manner disclosed herein.

Each processing element 1170, 1180 may include at least one shared cache 1896. The shared cache 1896a, 1896b may store data (e.g., instructions) that are utilized by one or more components of the processor, such as the cores 1174a, 1174b and 1184a, 1184b, respectively. For example, the shared cache may locally cache data stored in a memory 1132, 1134 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1170, 1180, it is to be understood that the scope of the present invention is not so limited. In other embodiments, one or more additional processing elements may be present in a given processor. Alternatively, one or more of processing elements 1170, 1180 may be an element other than a processor, such as an ASIC chip or a field programmable gate array. For example, additional processing element(s) may include additional processors(s) that are the same as a first processor 1170, additional processor(s) that are heterogeneous or asymmetric to processor a first processor 1170, accelerators (such as, e.g., graphics accelerators or digital signal processing (DSP) units), field programmable gate arrays, or any other processing element. There can be a variety of differences between the processing elements 1170, 1180 in terms of a spectrum of metrics of merit including architectural, microarchitectural, thermal, power consumption characteristics, and the like. These differences may effectively manifest themselves as asymmetry and heterogeneity amongst the processing elements 1170, 1180. For at least one embodiment, the various processing elements 1170, 1180 may reside in the same die package.

First processing element 1170 may further include memory controller logic (MC) 1172 and point-to-point (P-P) interfaces 1176 and 1178. Similarly, second processing element 1180 may include a MC 1182 and P-P interfaces 1186 and 1188. As shown in FIG. 11, MC's 1172 and 1182 couple the processors to respective memories, namely a memory 1132 and a memory 1134, which may be portions of main memory locally attached to the respective processors. While MC logic 1172 and 1182 is illustrated as integrated into the processing elements 1170, 1180, for alternative embodiments the MC logic may be discrete logic outside the processing elements 1170, 1180 rather than integrated therein.

First processing element 1170 and second processing element 1180 may be coupled to an I/O subsystem 1190 via P-P interconnects 1176, 1186 and 1184, respectively. As shown in FIG. 11, I/O subsystem 1190 includes P-P interfaces 1194 and 1198. Furthermore, I/O subsystem 1190 includes an interface 1192 to couple I/O subsystem 1190 with a high performance graphics engine 1138. In one embodiment, bus 1149 may be used to couple graphics engine 1138 to I/O subsystem 1190. Alternately, a point-to-point interconnect 1139 may couple these components.

In turn, I/O subsystem 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which may couple first bus 1116 to a second bus 1110. In one embodiment, second bus 1120 may be a low pin count (LPC) bus. Various devices may be coupled to second bus 1120 including, for example, a keyboard/mouse 1112, communication device(s) 1126 (which may in turn be in communication with the computer network 202), and a data storage unit 1128 such as a disk drive or other mass storage device which may include code 1130, in one embodiment. The code 1130 may include instructions for performing embodiments of one or more of the methods described above. Further, an audio I/O 1124 may be coupled to second bus 1120.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, the task streaming is readily scalable and can be implemented across a large number of components, as well as more complicated/sophisticated arrangements and configurations. Accordingly, the examples provided should not limit the scope or inhibit the broad teachings of task streaming as potentially applied to a myriad of other architectures.

It is also important to note that the functions related to task streaming, illustrate only some of the possible task streaming functions that may be executed by, or within, systems illustrated in FIGS. 1A-B, 2, 5-8, 12, and 13. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although systems in FIGS. 1A-B, 2, 5-8, 12, and 13 have been illustrated with reference to particular elements and operations that facilitate the task streaming functions, these elements and operations may be replaced by any suitable architecture, protocols, and/or processes that achieve the intended functionality of the task streaming system.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., user devices, task streaming clients, task streaming managers, and any components shown in FIGS. 1A-B, 2-3, and 5-8, etc.) disclosed herein may also include a memory device (or memory element) for storing information to be used in achieving the functions as outlined herein. Additionally, the systems and devices (e.g., user devices, task streaming clients, task streaming managers, and any components shown in FIGS. 1A-B, 2-3, and 5-8, etc.) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories* such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that much of the infrastructure discussed herein (e.g., user devices, task streaming clients, task streaming managers, and any components shown in FIGS. 1A-B, 2-3, and 5-8, etc.) can be provisioned as part of any type of network element. As used herein, the terms user devices, task streaming clients, task streaming managers, and any components shown in FIGS. 1A-B, 2-3, and 5-8 for enabling task streaming can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices (e.g., user devices, task streaming clients, task streaming managers, and any components shown in FIGS. 1A-B, 2-3, and 5-8 having network connectivity or communication channel with another component) can include software to achieve (or to foster) the provision of task streaming. This could include the implementation of instances of any of the components, engines, logic, etc. shown in the diagrams included herein. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the figures/drawings included herein (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the figures/drawings included herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures/drawings in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The following examples pertain to some embodiments of the disclosure.

Example 1 is at least one or a machine readable non-transitory storage medium having instructions stored thereon for task streaming between a first device and a second device remote from the first device, wherein the instructions when executed by at least one processors cause the at least one processors to perform the following operations: providing, from a task streaming client on the first device to a task streaming manager, metadata for identifying one or more files stored on the first device and one or more user preferences associated with capability(-ies) of the first device for operating on different types of files; receiving one or more user selections, at the first task streaming client on the first device, of: a file, an operation to be performed on the second device with the file, and the second device, wherein the file is selected from a plurality of files stored on a plurality of devices and the operation is selected from available operation(s) of the second device for operating on the file; and transmitting, from the first task streaming client to the task streaming manager, a task-context metadata tag identifying the file, the operation, and the second device, to enable the task streaming manager to notify the second device of the task-context metadata tag using a second task streaming client on the second device.

In Example 2, the subject matter of Example 1 can optionally include: wherein the plurality of files stored on a plurality of devices comprise files stored on the first device, the second device, and/or one or more networked storage devices.

In Example 3, the subject matter of Example 1 or 2 can optionally include: receiving, at the first task streaming client from the task streaming manager, metadata associated with files stored on the second device and/or one or more networked storage devices.

In Example 3, the subject matter of any one of the Examples 1-3 can optionally include: receiving, at the first task streaming client from the task streaming manager, available operation(s) associated with capability(-ies) of the second device for operating on different types of files.

In Example 5, the subject matter of any one of the Examples 1-4 can optionally include: upon receiving a selection of the file, determining the available operations(s) suitable for operating on the file by the second device based on the type of the file; and rendering, for displaying on a user interface, the available operations(s) suitable for operating on the file to enable a user at the first task streaming client to select one or more of the operations(s) as the operation.

In Example 6, the subject matter of any one of the Examples 1-6 can optionally include: detecting, using a listener of the first streaming client on the first device, for update(s) to the metadata for identifying the one or more files stored on the first device and/or update(s) to the one or more user preferences associated with capability(-ies) on the first device for operating on different types of files; and if any updates are detected, transmitting the update(s) from the first task streaming client to the task streaming manager.

In Example 7, the subject matter of any one of the Examples 1-6 can optionally include: receiving, at the first task streaming client from the task streaming manager, one or more of the following: (i) update(s) to metadata associated with files stored on the second device, (ii) update(s) to metadata associated with files stored on one or more networked storage devices; and (iii) update(s) to operations(s) associated with capability(-ies) on the second device for operating on different types of files.

In Example 8, the subject matter of any one of the Examples 1-7 can optionally include: receiving login credentials at the first task streaming client at the first device; and providing the login credentials from the first task streaming client to the task streaming manager to allow the task streaming manager to retrieve metadata associated with files stored on one or more networked storage devices.

Example 9 is at least one or a machine readable non-transitory storage medium having instructions stored thereon for managing task streaming between a first device and a second device remote from the first device, wherein the instructions when executed by at least one processors cause the at least one processors to perform the following operations: receiving, at a task streaming manager from a first task streaming client on the first device, a first metadata for identifying one or more files stored on the first device and one or more user preferences associated with capability(-ies) of the first device for operating on different types of files; receiving, at the task streaming manager from a second task streaming client on the second device, a second metadata for identifying one or more files stored on the second device and one or more user preferences associated with capability(-ies) of the second device for operating on different types of files; receiving, at the task streaming manager from the first task streaming client, a task-context metadata tag identifying a file, an operation, and the second device, wherein the file is selected using the first task streaming client from a plurality of files stored on a plurality of devices and the operation is selected using the first task streaming client from available operations(s) of the second device for operating on the file; and transmitting, from the task streaming manager to the second task streaming client, a notification of the task-context metadata tag.

In Example 10, the subject matter of Example 9 can optionally include: generating the available operations(s) of the second device for operating on different types of files based on the one or more user preferences of associated with capability(-ies) of the second device and one or more capabilities of the task streaming manager for converting the file to a format suitable for some of the one or more user preferences associated with capability(-ies) of the second device.

In Example 11, the subject matter of Example 9 or 10 can optionally include: retrieving the file; converting the file, at the task streaming manager, to a format suitable for some of the one or more user preferences associated with capability(-ies) of the second device using the one or more capabilities of a/the task streaming manager; and providing the second task streaming client access to the converted file.

In Example 12, the subject matter of any one of the Examples 9-11 can optionally include: adding the task-context metadata tag to a task list associated with the second device; maintaining the task list associated with the second device when the second device is not communicating with the task streaming manager; and pushing the task list associated with the second device when the second device communicably connects with the task streaming manager.

In Example 13, the subject matter of any one of the Examples 9-12 can optionally include: providing, from the task streaming manager to the first task streaming client, the second metadata and available operations associated with capability(-ies) of the second device for operating on different types of files; and providing, from the task streaming manager to the second task streaming client, the first metadata and available operations associated with capability(-ies) of the first device for operating on different types of files.

In Example 14, the subject matter of any one of the Examples 9-13 can optionally include: receiving, at the task streaming manager, one or more of the following: (i) update(s) to metadata associated with files stored on the second device, (ii) update(s) to metadata associated with files stored on one or more networked storage devices; and (iii) update(s) to one or more user preferences associated with capability(-ies) on the second device for operating on different types of files; and providing, from the task streaming manager to the first task streaming client, one or more of the following: (i) update(s) to metadata associated with files stored on the second device, (ii) update(s) to metadata associated with files stored on one or more networked storage devices; and (iii) update(s) to available operations associated with capability(-ies) on the second device for operating on different types of files.

Example 9a is a machine readable non-transitory storage medium having instructions stored thereon, wherein the instructions when executed by at least one processor cause the at least one processor to perform the following operations: receiving, from a first device, a first metadata for identifying one or more files stored on the first device and for identifying one or more user preferences associated with capability(-ies) of the first device for operating on different types of files; receiving, from a second device, a second metadata for identifying one or more files stored on the second device and for identifying one or more user preferences associated with capability(-ies) of the second device for operating on different types of files; receiving, from the first device, a task-context metadata tag identifying a file, an operation, and the second device, wherein the file is selected from a plurality of files stored on a plurality of devices and the operation is selected from available operations(s) of the second device for operating on the file; and transmitting to the second device, a notification of the task-context metadata tag.

In Example 10a, the subject matter of Example 9a can optionally include the operations further comprising generating the available operations(s) of the second device for operating on different types of files based on the one or more user preferences of associated with capability(-ies) of the second device and one or more capabilities for converting the file to a format suitable for some of the one or more user preferences associated with capability(-ies) of the second device.

In Example 11a, the subject matter of Example 9a or 10a can optionally include the operations further comprising: retrieving the file; converting the file to a format suitable for some of the one or more user preferences associated with capability(-ies) of the second device using the one or more capabilities; and providing the second device access to the converted file.

In Example 12a, the subject matter of any one of the Examples 9a, 10a, and 11a can optionally include the operations further comprising: adding the task-context metadata tag to a task list associated with the second device; maintaining the task list associated with the second device when the second device is not communicating with a task streaming manager; and pushing the task list associated with the second device when the second device communicably connects with the task streaming manager.

In Example 13a, the subject matter of any one of the Examples 9a, 10a, 11a, and 12a can optionally include the operations further comprising: providing, to the first device, the second metadata and available operations associated with capability(-ies) of the second device for operating on different types of files; and providing, to the second device, the first metadata and available operations associated with capability(-ies) of the first device for operating on different types of files.

In Example 14a, the subject matter of any one of the Examples 9a, 10a, 11a, 12a, and 13a can optionally include the operations further comprising: receiving one or more of the following: (i) update(s) to metadata associated with files stored on the second device, (ii) update(s) to metadata associated with files stored on one or more networked storage devices; and (iii) update(s) to one or more user preferences associated with capability(-ies) on the second device for operating on different types of files; and providing, to the first device, one or more of the following: (i) update(s) to metadata associated with files stored on the second device, (ii) update(s) to metadata associated with files stored on one or more networked storage devices; and (iii) update(s) to available operations associated with capability(-ies) on the second device for operating on different types of files.

Example 15 is at least one or a machine readable non-transitory storage medium having instructions stored thereon for task streaming between a first device and a second device remote from the first device, wherein the instructions when executed by at least one processors cause the at least one processors to perform the following operations: receiving, from a task streaming manager at a second task streaming client on the second device, a first metadata for identifying one or more files stored on the first device and one or more user preferences associated with capability (-ies) of the first device for operating on different types of files; and receiving, from the task streaming manager at the second task streaming client, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file.

In Example 16, the subject matter of Example 15 can optionally include: rendering the notification of the task-context metadata tag for display on the second device.

In Example 17, the subject matter of Example 15 or 16 can optionally include: providing a user interface using the second task streaming client to allow a user to indicate an acceptance to execute the operation on the file as identified by the task-context metadata tag.

In Example 18, the subject matter of any one of the Examples 15-17 can optionally include: executing, using the second device, the operation on the file as identified by the task-context metadata tag.

Example 19 is an apparatus for task streaming between a first device and a second device remote from the first device, the apparatus comprising: at least one memory element; at least one processors coupled to the at least one memory element; and a task streaming client on the first device that when executed by the at least one processors is configured to: provide, from a task streaming client on the first device to a task streaming manager, metadata for identifying one or more files stored on the first device and one or more user preferences associated with capability(-ies) of the first device for operating on different types of files; provide a user interface using the first task streaming client on the first device for a user to create a task context; receive, through the user interface, one or more user selections of: a file, an operation to be performed on the second device with the file, and the second device, wherein the file is selected from a plurality of files stored on a plurality of devices and the operation is selected from available operation(s) of the second device for operating on the file; and transmit, from the first task streaming client to the task streaming manager, a task-context metadata tag identifying the file, the operation, and the second device, to enable the task streaming manager to notify the second device of the task-context metadata tag using a second task streaming client on the second device.

In Example 20, the subject matter of Example 19 can optionally include the plurality of files stored on a plurality of devices comprising files stored on the first device, the second device, and/or one or more networked storage devices.

In Example 21, the subject matter of Example 19 or 20 can optionally include: receiving, at the first task streaming client from the task streaming manager, metadata associated with files stored on the second device and/or one or more networked storage devices.

In Example 22, the subject matter of any one of Examples 19-21 can optionally include: receiving, at the first task streaming client from the task streaming manager, available operation(s) associated with capability(-ies) of the second device for operating on different types of files.

In Example 23, the subject matter of any one of the Examples 19-22 can optionally include: upon receiving a selection of the file, determining the available operations(s) suitable for operating on the file by the second device based on the type of the file; and rendering, for displaying on a user interface, the available operations(s) suitable for operating on the file to enable a user at the first task streaming client to select one or more of the operations(s) as the operation.

In Example 24, the subject matter of any one of the Examples 19-23 can optionally include: detecting, using a listener of the first streaming client on the first device, for update(s) to the metadata for identifying the one or more files stored on the first device and/or update(s) to the one or more user preferences associated with capability(-ies) on the first device for operating on different types of files; and if any updates are detected, transmitting the update(s) from the first task streaming client to the task streaming manager.

In Example 25, the subject matter of any one of the Examples 19-24 can optionally include: receiving, at the first task streaming client from the task streaming manager, one or more of the following: (i) update(s) to metadata associated with files stored on the second device, (ii) update(s) to metadata associated with files stored on one or more networked storage devices; and (iii) update(s) to operations(s) associated with capability(-ies) on the second device for operating on different types of files.

In Example 26, the subject matter of any one of the Examples 19-25 can optionally include: receiving login credentials at the first task streaming client at the first device; and receiving the login credentials from the first task streaming client to the task streaming manager to allow the task streaming manager to retrieve metadata associated with files stored on one or more networked storage devices.

Example 27 is an apparatus for managing task streaming between a first device and a second device remote from the first device, the apparatus comprising: at least one memory element; at least one processors coupled to the at least one memory element; a task streaming manager that when executed by the at least one processors is configured to: receive, at a task streaming manager from a first task streaming client on the first device, a first metadata for identifying one or more files stored on the first device and one or more user preferences associated with capability(-ies) of the first device for operating on different types of files; receive, at the task streaming manager from a second task streaming client on the second device, a second metadata for identifying one or more files stored on the second device and one or more user preferences associated with capability(-ies) of the second device for operating on different types of files; receive, at the task streaming manager from the first task streaming client, a task-context metadata tag identifying a file, an operation, and the second device, wherein the file is selected using the first task streaming client from a plurality of files stored on a plurality of devices including the first device, the second device, and one or more networked storage devices, and the operation is selected using the first task streaming client from available operations(s) of the second device for operating on the file; and transmit, from the task streaming manager to the second task streaming client, a notification of the task-context metadata tag.

In Example 28, the subject matter of Example 27 can optionally include: generating the available operations(s) of the second device for operating on different types of files based on the one or more user preferences of associated with capability(-ies) of the second device and one or more capabilities of the task streaming manager for converting the file to a format suitable for some of the one or more user preferences associated with capability(-ies) of the second device.

In Example 29, the subject matter of Example 27 or 28 can optionally include: retrieving the file; converting the file, at the task streaming manager, to a format suitable for some of the one or more user preferences associated with capability(-ies) of the second device using the one or more capabilities of the task streaming manager; and providing the second task streaming client access to the converted file.

In Example 30, the subject matter of any one of the Examples 27-29 can optionally include: adding the task-context metadata tag to a task list associated with the second device; maintaining the task list associated with the second device when the second device is not communicating with the task streaming manager; and pushing the task list associated with the second device (to the second device) when the second device communicably connects with the task streaming manager.

In Example 32, the subject matter of any one of the Examples 27-30 can optionally include: providing, from the task streaming manager to the first task streaming client, the second metadata and available operations associated with capability(-ies) of the second device for operating on different types of files; and providing, from the task streaming manager to the second task streaming client, the first metadata and available operations associated with capability(-ies) of the first device for operating on different types of files.

In Example 32, the subject matter of any one of the Examples 27-31 can optionally include: receiving, at the task streaming manager, one or more of the following: (i) update(s) to metadata associated with files stored on the second device, (ii) update(s) to metadata associated with files stored on one or more networked storage devices; and (iii) update(s) to one or more user preferences associated with capability(-ies) on the second device for operating on different types of files; and providing, from the task streaming manager to the first task streaming client, one or more of the following: (i) update(s) to metadata associated with files stored on the second device, (ii) update(s) to metadata associated with files stored on one or more networked storage devices; and (iii) update(s) to available operations associated with capability(-ies) on the second device for operating on different types of files.

Example 33 is an apparatus for task streaming between a first device and a second device remote from the first device, the apparatus comprises: at least one memory element; at least one processors coupled to the at least one memory element; and a second task streaming client on the second device that when executed by the at least one processors is configure to: receive, from a task streaming manager at a second task streaming client on the second device, a first metadata for identifying one or more files stored on the first device and one or more user preferences associated with capability(-ies) of the first device for operating on different types of files; and receive, from the task streaming manager at the second task streaming client, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file; and provide, using the task streaming manager at the second task streaming client, a user interface for providing the notification to a user of the second device.

In Example 34, the subject matter of Example 33 can optionally include: rendering the notification of the task-context metadata tag for display on the second device.

In Example 35, the subject matter of Example 33 or 34 can optionally include: provide a user interface using the second task streaming client to allow a user to indicate an acceptance to execute the operation on the file as identified by the task-context metadata tag.

In Example 36, the subject matter of any one of the Examples 33-35 can optionally include: execute, using the second device, the operation on the file as identified by the task-context metadata tag.

Example 37 is a method for task streaming between a first device and a second device remote from the first device, the method comprising: providing, from a task streaming client on the first device to a task streaming manager, metadata for identifying one or more files stored on the first device and one or more user preferences associated with capability(-ies) of the first device for operating on different types of files; providing a user interface using the first task streaming client on the first device for a user to create a task context; receiving, through the user interface, one or more user selections of: a file, an operation to be performed on the second device with the file, and the second device, wherein the file is selected from a plurality of files stored on a plurality of devices and the operation is selected from available operation(s) of the second device for operating on the file; and transmitting, from the first task streaming client to the task streaming manager, a task-context metadata tag identifying the file, the operation, and the second device, to enable the task streaming manager to notify the second device of the task-context metadata tag using a second task streaming client on the second device.

In Example 38, the subject matter of Example 37 can optionally include: the plurality of files stored on a plurality of devices comprising files stored on the first device, the second device, and/or one or more networked storage devices.

In Example 39, the subject matter of Example 37 or 38 can optionally include: receiving, at the first task streaming client from the task streaming manager, metadata associated with files stored on the second device and/or one or more networked storage devices.

In Example 40, the subject matter of any one of the Examples 37-39 can optionally include: receiving, at the first task streaming client from the task streaming manager, available operation(s) associated with capability(-ies) of the second device for operating on different types of files.

In Example 41, the subject matter of any one of the Examples 37-40 can optionally include: upon receiving a selection of the file, determining the available operations(s) suitable for operating on the file by the second device based on the type of the file; and rendering, for displaying on a user interface, the available operations(s) suitable for operating on the file to enable a user at the first task streaming client to select one or more of the operations(s) as the operation.

In Example 42, the subject matter of any one of the Examples 37-41 can optionally include: detecting, using a listener of the first streaming client on the first device, for update(s) to the metadata for identifying the one or more files stored on the first device and/or update(s) to the one or more user preferences associated with capability(-ies) on the first device for operating on different types of files; and if any updates are detected, transmitting the update(s) from the first task streaming client to the task streaming manager.

In Example 43, the subject matter of any one of the Examples 37-42 can optionally include: receiving, at the first task streaming client from the task streaming manager, one or more of the following: (i) update(s) to metadata associated with files stored on the second device, (ii) update(s) to metadata associated with files stored on one or more networked storage devices; and (iii) update(s) to operations(s) associated with capability(-ies) on the second device for operating on different types of files.

In Example 44, the subject matter of any one of the Examples 37-43 can optionally include: receiving login credentials at the first task streaming client at the first device; and providing the login credentials from the first task streaming client to the task streaming manager to allow the task streaming manager to retrieve metadata associated with files stored on one or more networked storage devices.

Example 45 is a method for managing task streaming between a first device and a second device remote from the first device, the method comprising:

receiving, at a task streaming manager from a first task streaming client on the first device, a first metadata for identifying one or more files stored on the first device and one or more user preferences associated with capability(-ies) of the first device for operating on different types of files; receiving, at the task streaming manager from a second task streaming client on the second device, a second metadata for identifying one or more files stored on the second device and one or more user preferences associated with capability(-ies) of the second device for operating on different types of files; receiving, at the task streaming manager from the first task streaming client, a task-context metadata tag identifying a file, an operation, and the second device, wherein the file is selected using the first task streaming client from a plurality of files stored on a plurality of devices including the first device, the second device, and one or more networked storage devices, and the operation is selected using the first task streaming client from available operations(s) of the second device for operating on the file; and transmitting, from the task streaming manager to the second task streaming client, a notification of the task-context metadata tag.

In Example 46, the subject matter of Example 45 can optionally include: generating the available operations(s) of the second device for operating on different types of files based on the one or more user preferences of associated with capability(-ies) of the second device and one or more capabilities of the task streaming manager for converting the file to a format suitable for some of the one or more user preferences associated with capability(-ies) of the second device.

In Example 47, the subject matter of Examples 45 or 46 can optionally include: retrieving the file; converting the file, at the task streaming manager, to a format suitable for some of the one or more user preferences associated with capability(-ies) of the second device using the one or more capabilities of the task streaming manager; and providing the second task streaming client access to the converted file.

In Example 48, the subject matter of any one of the Examples 45-47 can optionally include: adding the task-context metadata tag to a task list associated with the second device; maintaining the task list associated with the second device when the second device is not communicating with the task streaming manager; and pushing the task list associated with the second device when the second device communicably connects with the task streaming manager.

In Example 49, the subject matter of any one of the Examples 45-47 can optionally include: providing, from the task streaming manager to the first task streaming client, the second metadata and available operations associated with capability(-ies) of the second device for operating on different types of files; and providing, from the task streaming manager to the second task streaming client, the first metadata and available operations associated with capability(-ies) of the first device for operating on different types of files.

In Example 50, the subject matter of any one of the Examples 45-49 can optionally include: receiving, at the task streaming manager, one or more of the following: (i) update(s) to metadata associated with files stored on the second device, (ii) update(s) to metadata associated with files stored on one or more networked storage devices; and (iii) update(s) to one or more user preferences associated with capability(-ies) on the second device for operating on different types of files; and providing, from the task streaming manager to the first task streaming client, one or more of the following: (i) update(s) to metadata associated with files stored on the second device, (ii) update(s) to metadata associated with files stored on one or more networked storage devices; and (iii) update(s) to available operations associated with capability(-ies) on the second device for operating on different types of files.

Example 51 is a method for task streaming between a first device and a second device remote from the first device, the method comprising: receiving, from a task streaming manager at a second task streaming client on the second device, a first metadata for identifying one or more files stored on the first device and one or more user preferences associated with capability(-ies) of the first device for operating on different types of files; and receiving, from the task streaming manager at the second task streaming client, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file; and providing, using the task streaming manager at the second task streaming client, a user interface for providing the notification to a user of the second device.

In Example 52, the subject matter of Example 51 can optionally include: rendering the notification of the task-context metadata tag for display on the second device.

In Example 53, the subject matter of Example 51 or 53 can optionally include: providing a user interface using the second task streaming client to allow a user to indicate an acceptance to execute the operation on the file as identified by the task-context metadata tag.

In Example 54, the subject matter of any one of the Examples 51-53 can optionally include: executing, using the second device, the operation on the file as identified by the task-context metadata tag.

Example 55 is an apparatus for task streaming between a first device and a second device remote from the first device, the apparatus comprising: means for providing, from a task streaming client on the first device to a task streaming manager, metadata for identifying one or more files stored on the first device and one or more user preferences associated with capability(-ies) of the first device for operating on different types of files; means for receiving one or more user selections, at the first task streaming client on the first device, of: a file, an operation to be performed on the second device with the file, and the second device, wherein the file is selected from a plurality of files stored on a plurality of devices and the operation is selected from available operation(s) of the second device for operating on the file; and means for transmitting, from the first task streaming client to the task streaming manager, a task-context metadata tag identifying the file, the operation, and the second device, to enable the task streaming manager to notify the second device of the task-context metadata tag using a second task streaming client on the second device.

Example 56 is an apparatus for managing task streaming between a first device and a second device remote from the first device, the apparatus comprising: means for receiving, at a task streaming manager from a first task streaming client on the first device, a first metadata for identifying one or more files stored on the first device and one or more user preferences associated with capability(-ies) of the first device for operating on different types of files; means for receiving, at the task streaming manager from a second task streaming client on the second device, a second metadata for identifying one or more files stored on the second device and one or more user preferences associated with capability(-ies) of the second device for operating on different types of files; means for receiving, at the task streaming manager from the first task streaming client, a task-context metadata tag identifying a file, an operation, and the second device, wherein the file is selected using the first task streaming client from a plurality of files stored on a plurality of devices and the operation is selected using the first task streaming client from available operations(s) of the second device for operating on the file; and means for transmitting, from the task streaming manager to the second task streaming client, a notification of the task-context metadata tag.

Example 57 is an apparatus for task streaming between a first device and a second device remote from the first device, the apparatus comprising: means for receiving, from a task streaming manager at a second task streaming client on the second device, a first metadata for identifying one or more files stored on the first device and one or more user preferences associated with capability(-ies) of the first device for operating on different types of files; and means for receiving, from the task streaming manager at the second task streaming client, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file.

Example 58 is an apparatus for task streaming between a first device and a second device remote from the first device, the apparatus comprising means for performing the method of any one of Examples 37-54.

In Example 59, the subject matter of Example 58 can optionally include the means for performing the method comprising at least one processors and at least one memory element.

In Example 60, the subject matter of 59 can optionally include the at least one memory element comprising machine readable instructions that when executed, cause the apparatus to perform the method of any one of Examples 37-54.

In Example 61, the subject matter of any of the Examples 58-60 can optionally include the apparatus being a computing device.

Example 62 is at least one or a machine readable storage medium comprising instructions for task streaming between a first device and a second device remote from the first device, wherein the instructions when executed implement a method or realize an apparatus as described in any one of the Examples 19-61.

Example 63 is a task-context metadata tag for task streaming between a first device and a second device remote from the first device, the task-context metadata tag comprising: a first identifier for a file, wherein the file is selectable from a plurality of files stored on a plurality of devices; a second identifier for an operation to be performed on the second device with the file, wherein the operation is selectable from available operation(s) of the second device for operating on the file; a third identifier for the second device; wherein the task-context metadata tag comprises information for enabling a task streaming manager to notify the second device of the task-context metadata tag using a second task streaming client on the second device.

What is claimed is:

1. A machine readable non-transitory storage medium having instructions stored thereon, wherein the instructions when executed by at least one processor cause the at least one processor to perform the following:
   receiving, from a first device, a first metadata for identifying one or more files stored on the first device and for identifying one or more user preferences associated with capability(-ies) of the first device for operating on different types of files;
   receiving, from a second device, a second metadata for identifying one or more files stored on the second device and for identifying one or more user preferences associated with capability(-ies) of the second device for operating on different types of files;
   receiving, from the first device, a task-context metadata tag identifying a file, an operation, and the second device, wherein the file is selected from a plurality of files stored on a plurality of devices and the operation is selected from available operation(s) of the second device for operating on the file; and
   transmitting to the second device, a notification of the task-context metadata tag.

2. The machine readable non-transitory storage medium of claim 1, wherein the instructions when executed by the at least one processor cause the at least one processor to further perform the following:
   generating the available operation(s) of the second device for operating on different types of files based on the one or more user preferences associated with capability(-ies) of the second device and one or more capabilities for converting the file to a format suitable for some of the one or more user preferences associated with capability(-ies) of the second device.

3. The machine readable non-transitory storage medium of claim 1, wherein the instructions when executed by the at least one processor cause the at least one processor to further perform the following:
   retrieving the file;
   converting the file to a format suitable for some of the one or more user preferences associated with capability(-ies) of the second device; and
   providing the second device access to the converted file.

4. The machine readable non-transitory storage medium of claim 1, the instructions when executed by the at least one processor cause the at least one processor to further perform the following:
   adding the task-context metadata tag to a task list associated with the second device;
   maintaining the task list associated with the second device when the second device is not communicating with a task streaming manager; and
   pushing the task list associated with the second device when the second device communicably connects with the task streaming manager.

5. The machine readable non-transitory storage medium of claim 1, the instructions when executed by the at least one processor cause the at least one processor to further perform the following:
   providing, to the first device, the second metadata and available operations associated with capability(-ies) of the second device for operating on different types of files; and
   providing, to the second device, the first metadata and available operations associated with capability(-ies) of the first device for operating on different types of files.

6. The machine readable non-transitory storage medium of claim 1, the instructions when executed by the at least one processor cause the at least one processor to further perform the following:
   receiving one or more of the following: (i) update(s) to metadata associated with files stored on the second device; (ii) update(s) to metadata associated with files stored on one or more networked storage devices; and (iii) update(s) to one or more user preferences associated with capability(-ies) on the second device for operating on different types of files; and
   providing, to the first device, one or more of the following: (i) update(s) to metadata associated with files stored on the second device; (ii) update(s) to metadata associated with files stored on one or more networked storage devices; and (iii) update(s) to available operations associated with capability(-ies) on the second device for operating on different types of files.

7. An apparatus for managing task streaming between a first device and a second device remote from the first device, the apparatus comprising:
   at least one memory element;
   at least one processor coupled to the at least one memory element; and
   a task streaming manager that when executed by the at least one processor is configured to:
      receive, from a first task streaming client on the first device, a first metadata for identifying one or more files stored on the first device and one or more user preferences associated with capability(-ies) of the first device for operating on different types of files;
      receive, from a second task streaming client on the second device, a second metadata for identifying one or more files stored on the second device and one or more user preferences associated with capability(-ies) of the second device for operating on different types of files;
      receive, from the first task streaming client, a task-context metadata tag identifying a file, an operation, and the second device, wherein the file is selected using the first task streaming client from a plurality of files stored on a plurality of devices including the first device, the second device, and one or more networked storage devices, and the operation is selected using the first task streaming client from available operations of the second device for operating on the file; and
      transmit, to the second task streaming client, a notification of the task-context metadata tag.

8. The apparatus of claim 7, wherein the task streaming manager is further configured to:
   generate the available operation(s) of the second device for operating on different types of files based on the one or more user preferences associated with capability(-ies) of the second device and one or more capabilities of the task streaming manager for converting the file to a format suitable for some of the one or more user preferences associated with capability(-ies) of the second device.

9. The apparatus of claim 7, wherein the task streaming manager is further configured to:
retrieve the file;
convert the file to a format suitable for some of the one or more user preferences associated with capability(-ies) of the second device; and
provide the second task streaming client access to the converted file.

10. The apparatus of claim 7, wherein the task streaming manager is further configured to:
add the task-context metadata tag to a task list associated with the second device;
maintain the task list associated with the second device when the second device is not communicating with the task streaming manager; and
push the task list associated with the second device when the second device communicably connects with the task streaming manager.

11. The apparatus of claim 7, wherein the task streaming manager is further configured to:
provide, from the task streaming manager to the first task streaming client, the second metadata and available operations associated with capability(-ies) of the second device for operating on different types of files; and
provide, from the task streaming manager to the second task streaming client, the first metadata and available operations associated with capability(-ies) of the first device for operating on different types of files.

12. The apparatus of claim 7, wherein the task streaming manager is further configured to:
receive, at the task streaming manager, one or more of the following: (i) update(s) to metadata associated with files stored on the second device; (ii) update(s) to metadata associated with files stored on one or more networked storage devices; and (iii) update(s) to one or more user preferences associated with capability(-ies) on the second device for operating on different types of files; and
provide, from the task streaming manager to the first task streaming client, one or more of the following: (i) update(s) to metadata associated with files stored on the second device; (ii) update(s) to metadata associated with files stored on one or more networked storage devices; and (iii) update(s) to available operations associated with capability(-ies) on the second device for operating on different types of files.

13. A method for managing task streaming between a first device and a second device remote from the first device, the method comprising:
receiving, at a task streaming manager from a first task streaming client on the first device, a first metadata for identifying one or more files stored on the first device and one or more user preferences associated with capability(-ies) of the first device for operating on different types of files;
receiving, at the task streaming manager from a second task streaming client on the second device, a second metadata for identifying one or more files stored on the second device and one or more user preferences associated with capability(-ies) of the second device for operating on different types of files;
receiving, at the task streaming manager from the first task streaming client, a task-context metadata tag identifying a file, an operation, and the second device, wherein the file is selected using the first task streaming client from a plurality of files stored on a plurality of devices including the first device, the second device, and one or more networked storage devices, and the operation is selected using the first task streaming client from available operation(s) of the second device for operating on the file; and
transmitting, from the task streaming manager to the second task streaming client, a notification of the task-context metadata tag.

14. The method of claim 13, further comprising:
generating the available operation(s) of the second device for operating on different types of files based on the one or more user preferences associated with capability(-ies) of the second device and one or more capabilities of the task streaming manager for converting the file to a format suitable for some of the one or more user preferences associated with capability(-ies) of the second device.

15. The method of claim 13, further comprising:
retrieving the file;
converting the file, at the task streaming manager, to a format suitable for some of the one or more user preferences associated with capability(-ies) of the second device; and
providing the second task streaming client access to the converted file.

16. The method of claim 13, further comprising:
adding the task-context metadata tag to a task list associated with the second device;
maintaining the task list associated with the second device when the second device is not communicating with the task streaming manager; and
pushing the task list associated with the second device when the second device communicably connects with the task streaming manager.

17. The method of claim 13, further comprising:
providing, from the task streaming manager to the first task streaming client, the second metadata and available operations associated with capability(-ies) of the second device for operating on different types of files; and
providing, from the task streaming manager to the second task streaming client, the first metadata and available operations associated with capability(-ies) of the first device for operating on different types of files.

18. The method of claim 13, further comprising:
receiving, at the task streaming manager, one or more of the following: (i) update(s) to metadata associated with files stored on the second device; (ii) update(s) to metadata associated with files stored on one or more networked storage devices; and (iii) update(s) to one or more user preferences associated with capability(-ies) on the second device for operating on different types of files; and
providing, from the task streaming manager to the first task streaming client, one or more of the following: (i) update(s) to metadata associated with files stored on the second device; (ii) update(s) to metadata associated with files stored on one or more networked storage devices; and (iii) update(s) to available operations associated with capability(-ies) on the second device for operating on different types of files.

19. A machine readable non-transitory storage medium having instructions stored thereon for task streaming between a first device and a second device remote from the first device, wherein the instructions when executed by at least one processor cause the at least one processor to perform the following:

providing, from a first task streaming client on the first device to a task streaming manager, metadata for identifying one or more files stored on the first device and one or more user preferences associated with capability(-ies) of the first device for operating on different types of files;

receiving one or more user selections, at the first task streaming client on the first device, of: a file, an operation to be performed on the second device with the file, and the second device, wherein the file is selected from a plurality of files stored on a plurality of devices and the operation is selected from available operation(s) of the second device for operating on the file; and transmitting, from the first task streaming client to the task streaming manager, a task-context metadata tag identifying the file, the operation, and the second device, to enable the task streaming manager to notify the second device of the task-context metadata tag using a second task streaming client on the second device.

20. The machine readable non-transitory storage medium of claim 19, wherein the plurality of files stored on a plurality of devices comprise files stored on the first device, the second device, and/or one or more networked storage devices.

21. The machine readable non-transitory storage medium of claim 19, wherein the instructions when executed by the at least one processor cause the at least one processor to further perform the following:

receiving, at the first task streaming client from the task streaming manager, available operation(s) associated with capability(-ies) of the second device for operating on different types of files.

22. The machine readable non-transitory storage medium of claim 19, wherein the instructions when executed by the at least one processor cause the at least one processor to further perform the following:

upon receiving a selection of the file, determining the available operation(s) suitable for operating on the file by the second device based on a type of the file; and rendering, for displaying on a user interface, the available operation(s) suitable for operating on the file to enable a user at the first task streaming client to select one or more of the operation(s) as the operation.

23. The machine readable non-transitory storage medium of claim 19, wherein the instructions when executed by the at least one processor cause the at least one processor to further perform the following:

detecting, using a listener of the first task streaming client on the first device, for update(s) to the metadata for identifying the one or more files stored on the first device and/or update(s) to the one or more user preferences associated with capability(-ies) on the first device for operating on different types of files; and if any updates are detected, transmitting the update(s) from the first task streaming client to the task streaming manager.

24. The machine readable non-transitory storage medium of claim 19, wherein the instructions when executed by the at least one processor cause the at least one processor to further perform the following:

receiving, at the first task streaming client from the task streaming manager, one or more of the following: (i) update(s) to metadata associated with files stored on the second device; (ii) update(s) to metadata associated with files stored on one or more networked storage devices; and (iii) update(s) to operation(s) associated with capability(-ies) on the second device for operating on different types of files.

25. The machine readable non-transitory storage medium of claim 19, wherein the instructions when executed by the at least one processor cause the at least one processor to further perform the following:

receiving login credentials at the first task streaming client at the first device; and providing the login credentials from the first task streaming client to the task streaming manager to allow the task streaming manager to retrieve metadata associated with files stored on one or more networked storage devices.

26. An apparatus for task streaming between a first device and a second device remote from the first device, the apparatus comprising:

at least one memory element;

at least one processor coupled to the at least one memory element; and a first task streaming client on the first device that when executed by the at least one processor is configured to:

provide, to a task streaming manager, metadata for identifying one or more files stored on the first device and one or more user preferences associated with capability(-ies) of the first device for operating on different types of files;

provide a user interface for a user to create a task context;

receive, through the user interface, one or more user selections of: a file, an operation to be performed on the second device with the file, and the second device, wherein the file is selected from a plurality of files stored on a plurality of devices and the operation is selected from available operation(s) of the second device for operating on the file; and transmit, to the task streaming manager, a task-context metadata tag identifying the file, the operation, and the second device, to enable the task streaming manager to notify the second device of the task-context metadata tag using a second task streaming client on the second device.

27. A method for task streaming between a first device and a second device remote from the first device, the method comprising:

providing, from a first task streaming client on the first device to a task streaming manager, metadata for identifying one or more files stored on the first device and one or more user preferences associated with capability(-ies) of the first device for operating on different types of files;

providing a user interface using the first task streaming client on the first device for a user to create a task context;

receiving, through the user interface, one or more user selections of: a file, an operation to be performed on the second device with the file, and the second device, wherein the file is selected from a plurality of files stored on a plurality of devices and the operation is selected from available operation(s) of the second device for operating on the file; and transmitting, from the first task streaming client to the task streaming manager, a task- context metadata tag identifying the file, the operation, and the second device, to enable the task streaming manager to notify the second device of the task-context metadata tag using a second task streaming client on the second device.

28. A machine readable non-transitory storage medium having instructions stored thereon for task streaming between a first device and a second device remote from the first device, wherein the instructions when executed by at least one processor cause the at least one processor to perform the following:

receiving, from a task streaming manager at a second task streaming client on the second device, a first metadata for identifying one or more files stored on the first device and one or more user preferences associated with capability(-ies) of the first device for operating on different types of files; and receiving, from the task streaming manager at the second task streaming client, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file.

29. The machine readable non-transitory storage medium of claim 28, wherein the instructions when executed by the at least one processor cause the at least one processor to further perform the following:

rendering the notification of the task-context metadata tag for display on the second device.

30. The machine readable non-transitory storage medium of claim 28, wherein the instructions when executed by the at least one processor cause the at least one processor to further perform the following:

providing a user interface using the second task streaming client to allow a user to indicate an acceptance to execute the operation on the file as identified by the task-context metadata tag.

31. The machine readable non-transitory storage medium of claim 28, wherein the instructions when executed by the at least one processor cause the at least one processor to further perform the following:

executing, using the second device, the operation on the file as identified by the task-context metadata tag.

32. An apparatus for task streaming between a first device and a second device remote from the first device, the apparatus comprises:

at least one memory element;

at least one processors coupled to the at least one memory element; and a second task streaming client on the second device that when executed by the at least one processors is configure to:

receive, from a task streaming manager, a first metadata for identifying one or more files stored on the first device and one or more user preferences associated with capability(-ies) of the first device for operating on different types of files;

receive, from the task streaming manager, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file; and provide, using the second task streaming manager, a user interface for providing the notification to a user of the second device.

33. A method for task streaming between a first device and a second device remote from the first device, the method comprising:

receiving, from a task streaming manager at a second task streaming client on the second device, a first metadata for identifying one or more files stored on the first device and one or more user preferences associated with capability(-ies) of the first device for operating on different types of files; and receiving, from the task streaming manager at the second task streaming client, a notification of a task-context metadata tag identifying a file, an operation, and the second device, wherein the file is selected using a first task streaming client on the first device from a plurality of files stored on a plurality of devices and the operation is selected using the first task streaming client from available operations of the second device for operating on the file; and providing, using the task streaming manager at the second task streaming client, a user interface for providing the notification to a user of the second device.

* * * * *

UNITED STATES PATENT AND TRADEMARK OFFICE
CERTIFICATE OF CORRECTION

PATENT NO.        : 9,936,018 B2
APPLICATION NO.   : 14/912318
DATED             : April 3, 2018
INVENTOR(S)       : Dattatraya Kulkarni et al.

Page 1 of 1

It is certified that error appears in the above-identified patent and that said Letters Patent is hereby corrected as shown below:

On the Title Page

Item [72], Line 5, delete "Shailaja" and insert -- Sailaja --, therefor.

Signed and Sealed this
Second Day of April, 2019

Andrei Iancu
*Director of the United States Patent and Trademark Office*